United States Patent
Furukawa

(10) Patent No.: US 7,512,873 B2
(45) Date of Patent: Mar. 31, 2009

(54) PARALLEL PROCESSING APPARATUS DYNAMICALLY SWITCHING OVER CIRCUIT CONFIGURATION

(75) Inventor: Hiroshi Furukawa, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 424 days.

(21) Appl. No.: 11/494,477

(22) Filed: Jul. 28, 2006

(65) Prior Publication Data
US 2007/0245178 A1 Oct. 18, 2007

(30) Foreign Application Priority Data
Mar. 22, 2006 (JP) ............................. 2006-079684

(51) Int. Cl.
*G06F 7/02* (2006.01)
(52) U.S. Cl. ........................................ 714/820; 712/15
(58) Field of Classification Search .................. 712/16, 712/14, 15; 716/16; 700/3; 711/149; 714/820
See application file for complete search history.

(56) References Cited

U.S. PATENT DOCUMENTS 4,943,912 A * 7/1990 Aoyama et al. ............... 712/16
5,095,527 A * 3/1992 Uramoto et al. ............... 712/14
6,438,737 B1 * 8/2002 Morelli et al. ................ 716/16
6,597,956 B1 * 7/2003 Aziz et al. ..................... 700/3
2006/0064553 A9 * 3/2006 Giernalczyk et al. ........ 711/149

FOREIGN PATENT DOCUMENTS

JP 01-320564 12/1989
JP 05-324694 12/1993

* cited by examiner

*Primary Examiner*—David Ton
(74) *Attorney, Agent, or Firm*—Staas & Halsey LLP

(57) ABSTRACT

A parallel processing apparatus dynamically switching over a circuit configuration includes a plurality of computing elements, a network establishing connections between the plural computing elements, a plurality of selectors provided corresponding to the plurality of computing elements within the network and controlling outputs from the computing elements, first local memories stored with data used for the operations by the computing elements and connected to the respective computing elements, and second local memories stored with data used for controlling the connections by the selectors and connected to the respective selectors.

10 Claims, 20 Drawing Sheets

RECONFIGURATION

FIG. 14

$$X = \begin{pmatrix} x00 & x10 & x20 \\ x01 & x11 & x21 \\ x02 & x12 & x22 \end{pmatrix}$$

FIG. 15

| a00 | a10 | a20 |
|-----|-----|-----|
| a01 | a11 | a21 |
| a02 | a12 | a22 |

FIG. 23

| PROCESSOR ELEMENT | OPERATION COUNT WHEN PC VALUE IS 0 | OPERATION COUNT WHEN PC VALUE IS 0 |
|---|---|---|
| PE0 | 5 | 1 |
| PE1 | 10 | 2 |
| PE2 | 7 | 3 |
| ... | ... | ... |
| PEn | 5 | 1 |

PARALLEL PROCESSING APPARATUS DYNAMICALLY SWITCHING OVER CIRCUIT CONFIGURATION

BACKGROUND OF THE INVENTION

The present invention relates to a parallel processing apparatus dynamically switching over a circuit configuration.

A reconfigurable circuit includes a plurality of computing elements (which are also called processor elements (PEs)) and a circuit (a network) for executing a delay adjustment, and is packaged in a semiconductor (e.g., an LSI). This circuit connects the respective computing elements and executes parallel processing. Further, the circuit sets, based on configuration data for batchwise controlling the circuit, a circuit configuration thereof, i.e., a type of the operation to be executed by each computing element and a connection between the computing elements. The circuit includes a configuration memory stored with the configuration data. The circuit, when reconfiguration of the circuit is required, loads configuration data that designates the circuit requiring the reconfiguration from the configuration memory. The circuit sets, based on the loaded data, the types of the respective operations executed by the plurality of computing elements and the connections between the computing elements. Further, the circuit reconfigures the circuit on the basis of the data loaded from the configuration memory, thereby dynamically switching over the circuit configuration. Herein, a phrase [dynamically switching over the circuit configuration] connotes that the circuit is reconfigured during a period for which the circuit processes the operation target data.

The following are given as the prior art technical documents related to the present invention.

[Patent document 1] Japanese Patent Application Laid-Open Publication No. 1-320564

[Patent document 2] Japanese Patent Application Laid-Open Publication No. 5-324694

FIG. 20 shows an example of a configuration of a reconfigurable circuit 1 according to the prior art. The reconfigurable circuit 1 includes a plurality of PEs 2, a configuration memory 3 and a network 4 that connects the plurality of PEs 2 and the configuration memory 3 to each other.

The reconfigurable circuit 1, when operating the circuit, uses configuration data stored in the configuration memory 3. The reconfigurable circuit 1 configures, based on the configuration data, types of the respective operations executed by the plurality of PEs 2 and the connections by the selectors establishing the connections within the network 4.

The reconfigurable circuit 1, during the operation of the circuit, employs the configuration data stored in the configuration memory 3. The reconfigurable circuit 1 dynamically switches over, based on the configuration data, the types of the respective operations executed by the plurality of PEs 2 and the connections by the selectors specifying the connections within the network 4. The reconfigurable circuit 1 according to the prior art as shown in FIG. 20 has the following four problems.

Firstly, the reconfigurable circuit 1 configures, for the operation of the circuit, the types of the respective operations executed by the plurality of PEs 2 and the connections by the selectors establishing the connections within the network 4. Accordingly, the reconfigurable circuit 1, for the operation of the circuit, previously loads the configuration data designating the configuration of the whole circuit into the PEs 2 and the selectors within the network 4 from the configuration memory 3. The reconfigurable circuit 1 sets, based on the loaded data, with respect to the whole circuit, the types of the respective operations executed by the plurality of PEs 2 and the connections by the selectors establishing the connections within the network 4. Therefore, such a problem arises that the reconfigurable circuit 1 requires the time for configuring the circuit.

Secondly, a case of switching over the type of the operation (e.g., an arithmetic operation) executed by the single PE 2 in the reconfigurable circuit 1 will be explained. Further, this case includes a case of switching over, in the reconfigurable circuit 1, setting of the connections by the selectors establishing the connections within the network 4. For this switchover, the reconfigurable circuit 1 also loads the configuration data designating the configuration of the whole circuit from the configuration memory 3 each time the switchover of the circuit configuration is executed. The reconfigurable circuit 1 reconfigures, based on the loaded data, the types of the operations executed by the PEs 2 and the setting of the connections by the selectors establishing the connections within the network 4. The reconfigurable circuit 1 reconfigures the circuit in these procedures and therefore requires the time for reconfiguring the circuit. Another problem is that the reconfigurable circuit 1 is unable to process the operation target data for a period of time during which the circuit is reconfigured.

FIG. 21 shows how the reconfigurable circuit 1 operates to switch over the type of the operation executed by one of the plurality of PEs 2. The PE 2 (PE 2A) before the switchover executes addition (ADD). Further, the PE 2 (PE 2B) after the switchover executes subtraction (SUB). The reconfigurable circuit 1 also, in the case of switching over the type of the operation (e.g., the switchover from ADD to SUB) executed by one of the plurality of PEs 2, loads the configuration data designating the configuration of the whole circuit from the configuration memory 3. The reconfigurable circuit 1 reconfigures, based on the loaded data, the types of the operations executed by the PEs 2 and the connections by the selectors establishing the connections within the network 4.

FIG. 22 shows a pipeline representing an operation of, after the configuration of the reconfigurable circuit 1 has been switched over once in the middle of processing the data by this circuit, again processing the data. The reconfigurable circuit 1, for switching over this circuit configuration, loads the configuration data designating (the configuration of) the whole circuit, which are stored in the configuration memory 3, and thus reconfigures the circuit. Accordingly, as illustrated in FIG. 22, during the reconfiguration (Reconfig) of this circuit, the reconfigurable circuit 1 does not process the operation target data. Hence, during the reconfiguration of the circuit, a clock cycle in which none of the data is processed occurs in the reconfigurable circuit 1. Especially, the circuit with the pipeline formed requires cycles corresponding to the number of stages till parallel operations of the respective stages of the pipeline are conducted. Accordingly, the reconfiguration of the whole circuit leads to a decrease in efficiency (a rate of the parallel operation period of the respective stages) of the pipeline.

Thirdly, the configuration data designating the whole circuit are stored in the configuration memory 3. The configuration data have a comparatively large data size. Accordingly, in the process of the operation target data, when the reconfigurable circuit 1 needs a plurality of circuit configurations, a problem arises, wherein the configuration memory 3 is required to have an extremely large storage capacity. A further problem is that if the configuration memory 3 has the large storage capacity and is stored with the data having the large data size, there is such a problem that the reconfigurable circuit 1 requires the time for accessing the stored data.

Considered, as for a problem similar to the third problem, is a case where the reconfigurable circuit 1 loads the configuration data into the configuration memory 3 from a memory (unillustrated) outside the LSI packaging this circuit. In this case, the configuration data used for every circuit configuration have the comparatively large data size, and hence a problem is that an extremely long period of time is needed for loading the data.

Considered, for instance, is such a state that the LSI packaging the reconfigurable circuit 1 uses an external memory (unillustrated) accessible on a 32-bit unit and an internal memory (configuration memory 3) accessible on the 32-bit unit. In this state, such a case is considered that the data having a 1000-bit data size as a whole are loaded from the external memory of LSI. In this case, an assumption is that the reconfigurable circuit 1 writes the data having a 32-bit data size to the configuration memory 3 at one cycle (clock). Hence, the reconfigurable circuit 1 requires at least 1000/32 cycles, i.e., approximately 32-cycle write time till the data finishes being written.

The present application was made in view of the problems inherent in the prior art described above. Namely, it is an object of the present invention to provide a parallel processing apparatus for actualizing faster parallel processing with a storage medium having a smaller capacity and dynamically switching over a circuit configuration.

SUMMARY OF THE INVENTION

The present invention adopts the following configurations in order to solve the problems described above.

(1) Namely, a parallel processing apparatus dynamically switching over a circuit configuration according to the present invention comprises a plurality of computing elements, a network establishing connections between the plural computing elements, a plurality of selectors provided corresponding to the plurality of computing elements within the network and controlling as to whether the computing element is connected to the network or not, first local memories stored with data used for the operations by the computing elements and data designating the operations, and connected to the respective computing elements, and second local memories stored with data designating connections by the selectors, and connected to the respective selectors.

According to this configuration, the parallel processing apparatus has the plurality of computing elements, the network establishing connections between the plural computing elements, the plurality of selectors provided corresponding to the plurality of computing elements within the network and controlling as to whether the computing element is connected to the network or not, the first local memories stored with the data used for the operations by the computing elements and the data designating the operations, and connected to the respective computing elements, and the second local memories stored with the data designating connections by the selectors, and connected to the respective selectors. The parallel processing apparatus dynamically switching over the circuit configuration is thereby capable of executing the operation process based on the data stored in the first local memory and in the second local memory.

(2) Further, a parallel processing apparatus dynamically switching over a circuit configuration according to the present invention may comprise a plurality of computing elements, a network establishing connections between the plural computing elements, a plurality of selectors provided corresponding to the plurality of computing elements within the network and controlling as to whether an output from the computing element is outputted to the network or not, third local memories stored with data used for the operations by the computing elements and data designating the operations, and connected to every predetermined number of the computing elements capable of parallel processing and employed for executing a predetermined process, and a fourth local memory stored with data designating connections by the selectors and stored with connection information about the predetermined number of computing elements.

According to this configuration, the parallel processing apparatus has the plurality of computing elements, the network establishing connections between the plural computing elements, the plurality of selectors provided corresponding to the plurality of computing elements within the network and controlling as to whether an output from the computing element is outputted to the network or not, the third local memories stored with the data used for the operations by the computing elements and the data designating the operations, and connected to every predetermined number of the computing elements capable of parallel processing and employed for executing the predetermined process, and the fourth local memory stored with the data designating connections by the selectors and stored with the connection information about the predetermined number of computing elements. The parallel processing apparatus dynamically switching over the circuit configuration is thereby capable of executing the operation process based on the data stored in the third local memory and in the fourth local memory.

(3) Moreover, in the parallel processing apparatus dynamically switching over the circuit configuration according to the present invention, the computing element may switch over the operation executed by the self computing element and one other computing element on the basis of the data stored in the first local memory.

According to this configuration, the computing element switches over the operation executed by the self computing element and one other computing element on the basis of the data stored in the first local memory. This computing element is thereby capable of autonomously switching over the circuit configuration on the basis of the data stored in the first local memory.

(4) Still further, in the parallel processing apparatus dynamically switching over the circuit configuration according to the present invention, the selector may switch over a connection state of the self selector on the basis of the data stored in the second local memory.

According to this configuration, the selector switches over the connection state of the self selector on the basis of the data stored in the second local memory. This selector is thereby capable of autonomously switching over the circuit configuration on the basis of the data stored in the second local memory.

(5) Yet further, the parallel processing apparatus dynamically switching over the circuit configuration according to the present may further comprise operation control devices connected to the plurality of computing elements and instructing each of the computing elements to switch over the operation that should be executed.

According to this configuration, this parallel processing apparatus can, through the operation control devices instructing the switchover of the operation that should be executed, instruct each computing element connected to the plurality of computing elements to switch over the operation that should be executed.

(6) Additionally, the parallel processing apparatus dynamically switching over the circuit configuration according to the present invention may further comprise connection control devices connected to the plurality of selectors and instructing each of the selectors to switch over the connection.

According to this configuration, the parallel processing apparatus can, through the connection control devices instructing each of the selectors to switch over the connection, instruct the switchover of each of the selectors.

(7) Moreover, in the computing element related to the parallel processing apparatus dynamically switching over the circuit configuration according to the present invention, the switchover of the operation executed for each of the computing elements may be executed based on a table stored in the operation control device and retaining information about the first computing element, the second computing element of which the operation should be switched over when the operation of the first computing element is terminated, and switchover timing thereof.

According to this configuration, this parallel processing apparatus executes the switchover of the operation executed for each of the computing elements on the basis of the table stored in the operation control device and retaining information about the first computing element, the second computing element of which the operation should be switched over when the operation of the first computing element is terminated, and the switchover timing thereof. The parallel processing apparatus is thereby capable of executing the switchover of the computing element by use of the computing element that should be switched over and the switchover timing thereof.

(8) Still moreover, in the selector related to the parallel processing apparatus dynamically switching over the circuit configuration according to the present invention, the switchover of the connection for each of the selectors may be executed based on a table stored in the connection control device and retaining information about the first selector, the second selector of which the connection should be switched over when the connection of the first selector is terminated, and switchover timing thereof.

According to this configuration, this parallel processing apparatus can execute the switchover of the connection for each of the selectors on the basis of the table stored in the connection control device and retaining information about the first selector, the second selector of which the connection should be switched over when the connection of the first selector is terminated, and the switchover timing thereof.

(9) Yet moreover, in the parallel processing apparatus dynamically switching over the circuit configuration according to the present invention, the first local memory connected to one computing element may be rewritten via one computing element, while the second local memory connected to one selector may be rewritten via one selector.

According to this configuration, the parallel processing apparatus rewrites the first local memory connected to one computing element via one computing element, while the parallel processing apparatus rewrites the second local memory connected to one selector via one selector. The parallel processing apparatus is thereby capable of rewriting the individual local memories.

(10) Furthermore, in the parallel processing apparatus dynamically switching over the circuit configuration according to the present invention, the operation control device may include a unit storing information about switchover timing at which the operation that should be executed next is set in each of the computing elements when the operation of each of the computing elements is terminated, and a switchover unit setting, before the switchover timing, data for setting the operation that should be executed next in the computing element concerned in a disable status where the input of the data is inhibited, and making, at the switchover timing, the computing element concerned be in an enable status by canceling the disenable status where the input of the switchover data is inhibited.

According to this configuration, the operation control device can store information about the switchover timing at which the operation that should be executed next is set in each of the computing elements when the operation of each of the computing elements is terminated, then can set, before the switchover timing, data for setting the operation that should be executed next in the computing element concerned in the disable status where the input of the data is inhibited, and can set, at the switchover timing, the computing element concerned in the enable status by canceling the disenable status where the input of the switchover data is inhibited.

Moreover, the present invention may also be a parallel processing method of executing the processes described above in the parallel processing apparatus dynamically switching over the circuit configuration described above.

according to the present invention, it is possible to provide the parallel processing technology of actualizing the faster parallel processing with the storage medium having the smaller capacity and dynamically switching over the circuit configuration during the operation.

BRIEF DESCRIPTION OF THE DRAWINGS

FIG. 14 is a diagram showing an example of a line buffer;

FIG. 15 is a diagram showing an example of image filter coefficients;

FIG. 23 is a diagram showing an example of a switchover timing indication table.

DETAILED DESCRIPTION OF THE INVENTION

An embodiment of the present invention will hereinafter be described with reference to the drawings.

A configuration in the following embodiment is an exemplification, and the present invention is not limited to the configuration in the embodiment.

Embodiment

Figure 1:
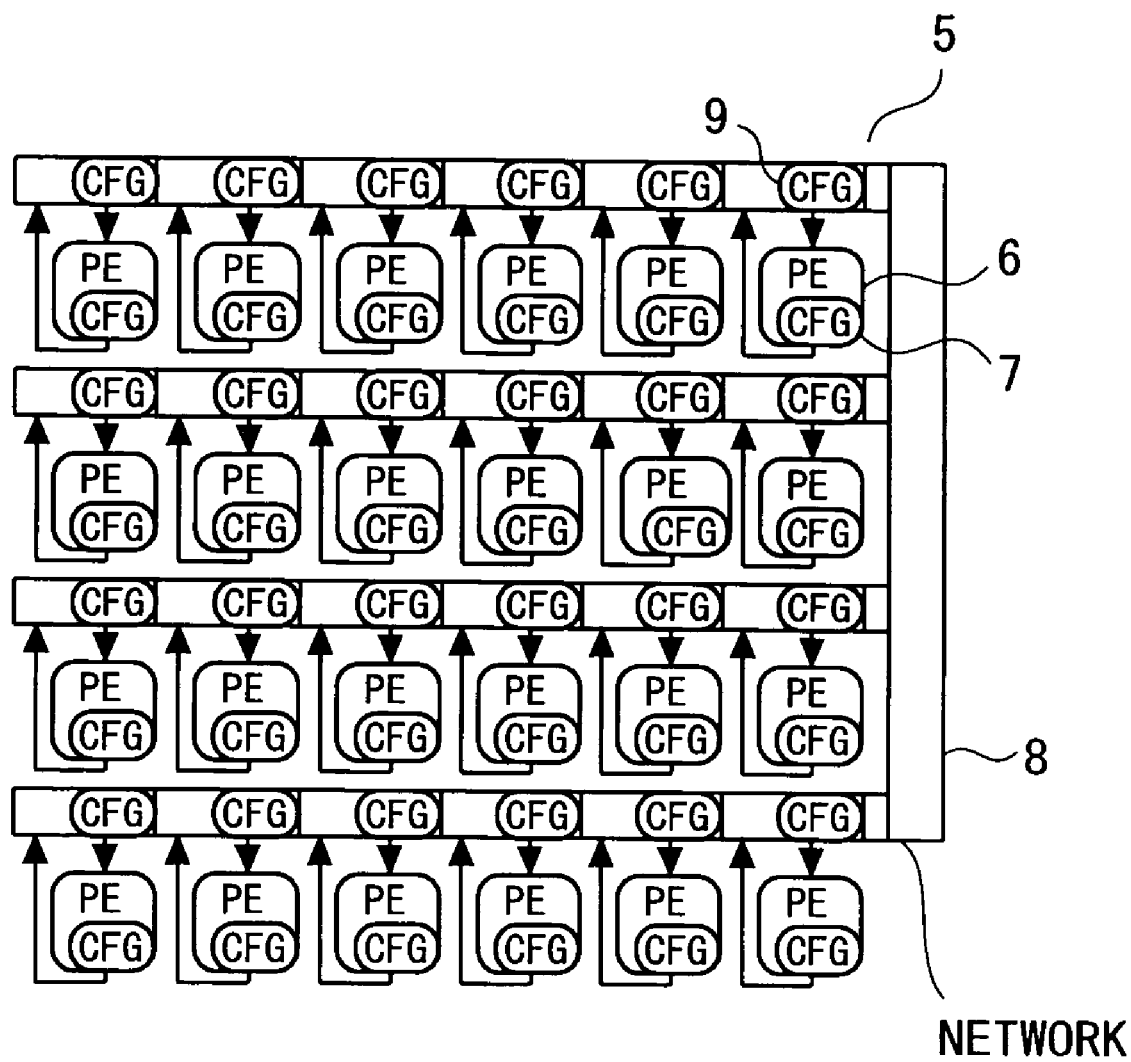
FIG. 1 is a diagram of a basic configuration of a reconfigurable circuit in an embodiment of the present invention.

A parallel processing apparatus in an embodiment of the present invention will hereinafter be explained with reference to the drawings in FIGS. 1 through 17. FIG. 1 illustrates an example of a configuration of a reconfigurable circuit according to the present invention. This reconfigurable circuit 5 (corresponding to a parallel processing apparatus dynamically switching over a circuit configuration according to the present invention) includes a plurality of PEs 6 (each corresponding to an operation unit according to the present invention), configuration memories 7 (each corresponding to a first local memory according to the present invention) connected to the respective PEs 6, a network 8 establishing a connection between the plural PEs 6, and a plurality of configuration memories 9 (each corresponding to a second local memory according to the present invention) connected to the network 8. Herein, the PE 6, the configuration memory 7 and the configuration memory 9 are in a one-to-one correspondence relationship.

The PE 6 executes an operation on the basis of configuration data stored in the configuration memory 7 and a command. In this case, the PE 6 processes the data stored in the configuration memory 7.

Further, the PE 6 may process data given from the outside of this circuit. The PE 6 executes an arithmetic operation, a logical operation, a counter process, reading of data or a delay adjustment. Further, the PE 6 executes the arithmetic operation, the logical operation, the counter process or reading of data, and may, on the other hand, execute the delay adjustment.

When switching over a type of operation executed by the PE 6, the PE 6 receives a write enable (Write Enable) signal at a rising edge of a clock. The write enable signal is a signal used for notification of switching over the type of the operation to be executed next by the PE 6. The PE 6, when receiving the write enable signal, switches over the type of the operation to be executed at a falling edge of the clock. The PE 6, after switching over the type of the operation to be executed, processes the data stored in the configuration memory 7. The PE 6, after switching over the type of the operation to be executed, increments a value of a program counter by 1. The PE 6, on the occasion of terminating the operation by the PE 6, may transmit a termination signal.

Further, the PE 6 may autonomously switch over the self PE 6 on the basis of the data stored in the configuration memory 7 and a command. The PE 6 may send, based on the data stored in the configuration memory 7 and the command, a switchover instruction for switching over the type of the operation to be executed to one other PE 6. Further, the PE 6 may rewrite the configuration memory 7 by a command given from a control device (a sequence control unit 12 that will be explained later on with reference to FIG. 6A) for controlling all the PEs 6. In this case, the PE 6 switches over the type of the operation to be executed as triggered by the write enable signal sent from the sequence control unit 12 (see FIG. 6A).

The configuration memory 7 is stored with the operation target data to be processed by the PE 6. Further, the configuration memory 7 may also be stored with information about timing when the operation to be executed by the PE 6 is finished. Still further, the configuration memory 7 may also be stored with the data and the command used for the PE 6 to instruct the switchover to the self PE 6 or one other PE 6. The configuration memory 7 may be rewritten by an instruction given from a device (unillustrated) connected to the outside of the reconfigurable circuit 5.

Figure 2:
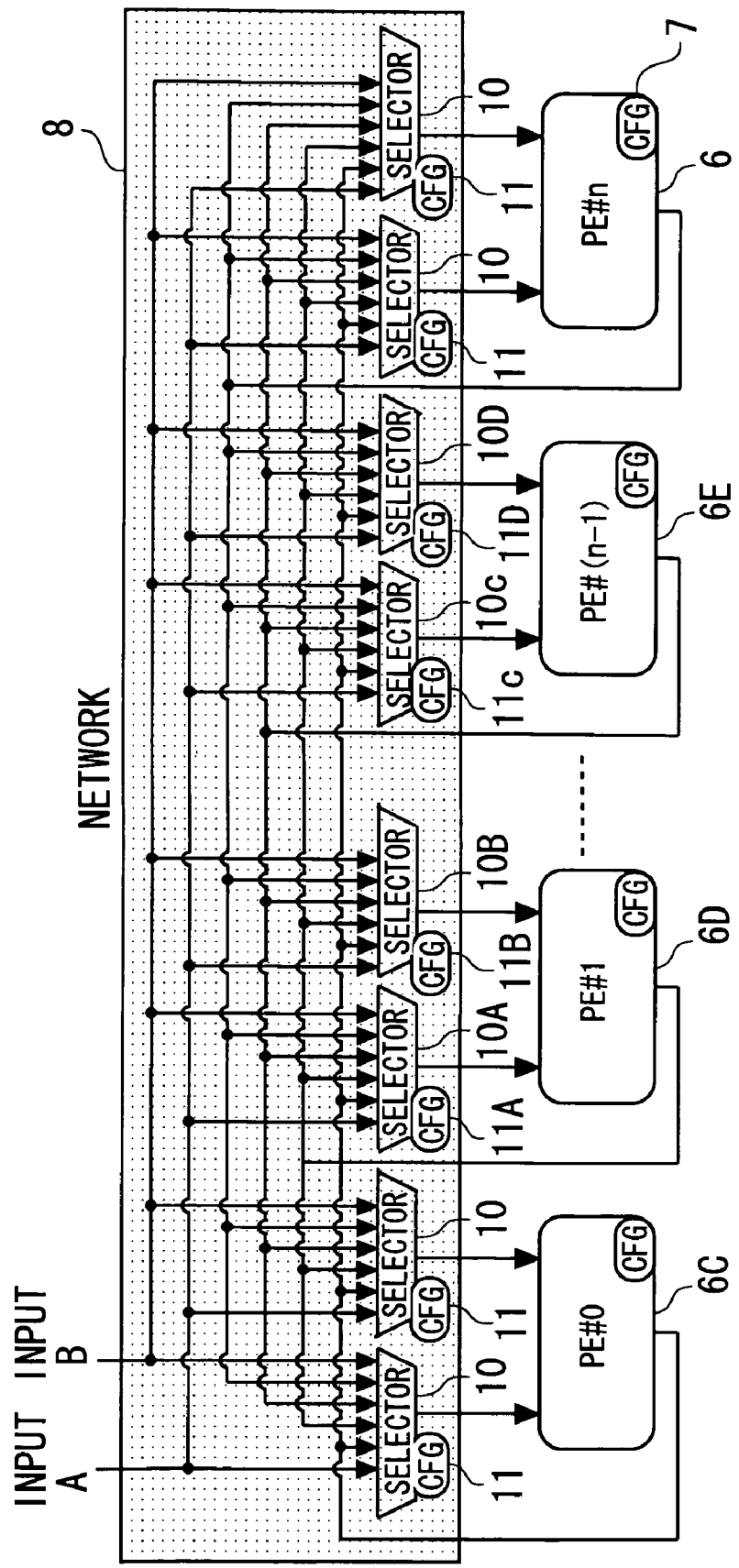
FIG. 2 is a diagram of a basic configuration of a network according to the embodiment of the present invention.

FIG. 2 shows the configuration of the network 8 in greater detail. As shown in FIG. 2, selectors 10 (each corresponding to a selector according to the present invention) and configuration memories 11 connected to the selectors 10 are provided within the network 8. In FIG. 2, the selectors 10 are connected by twos to the PEs 6. FIG. 2 illustrates the configuration memory 9 shown in FIG. 1 in a way that divides the configuration memory 9 into two pieces of configuration memories 11 provided in a 2-tuple of selectors 10 in order to illustrate the configuration of the network 8 in greater detail.

The selector 10 has a plurality of switches inside. In the case of the reconfigurable circuit 5, there are 24 pieces of PEs 6. Accordingly, the selector 10 has, if adjusting outputs from all the PEs 6, 24 pieces of switches. In FIG. 2, signals coming from six communication lines are inputted to each selector 10. Hence, the selector 10 shown in FIG. 2 has the six switches inside. The selector 10 switches ON one of the plurality of switches provided inside, and switches OFF the other switches. A signal in the selector 10 is inputted from the communication line designated to be switch-ON. The selector 10 selects one of the plural input signals, and outputs the signal to a predetermined output destination. An adjustment of the signal output destination by the selector 10 is also referred to as a connection by the selector 10. Accordingly, the switchover of the connection by the selector 10 represents the switchover of the switch within the selector 10. The switchover of the switch is executed at the rising edge of the clock. The selector 10, after the switchover of the switch, executes the data communications.

The selector 10 controls the signal output to the PE 6 on the basis of the data stored in the configuration memory 11 or on the basis of the data and the command. The selector 10 may switch over the connection by the self selector 10 or one other selector 10 on the basis of the data stored in the configuration memory 11 and the command. The selector 10 may rewrite the data stored in the configuration memory 11 connected to the selector 10 by an instruction given from the PE 6. Further, the selector 10 may rewrite the configuration memory 11 by a command given from the control device (the sequence control unit 12 that will be explained later on with reference to FIG. 6A) for controlling batchwise all the selectors 10.

The configuration memory 11 may be rewritten via the selector 10. The configuration memory 11 may also be rewritten by the instruction given from the PE 6. The configuration memory 11 may also be rewritten by an instruction given from a device (unillustrated) connected to the outside of the reconfigurable circuit 5.

Figure 3:
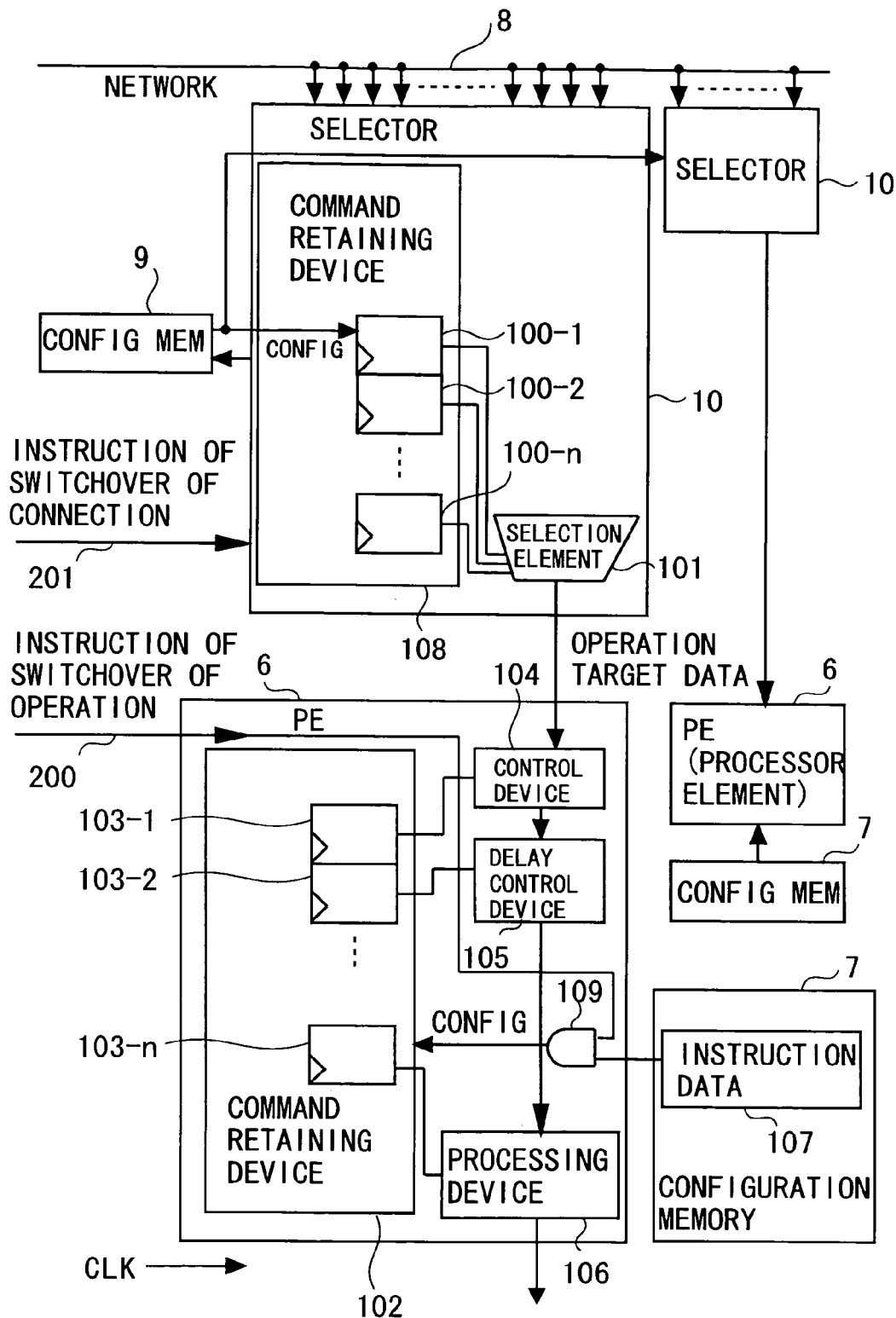
FIG. 3 is a diagram of basic configurations of processor elements and selectors according to the embodiment of the present invention.

Next, the type of the operation executed by the PE 6 and the connection switchover by the selector 10 will be explained with reference to FIG. 3. Flip-flop circuits 103-1 through 103-$n$ in the PE 6, a control device 104 in the PE 6 and flip-flop circuits 100-1 through 100-$n$ in the selector 10 are synchronized by clocks (CLK) of the same timing.

The flip-flop circuit 100 is stored with the data given from the configuration memory 9. The flip-flop circuit 100 (each of 100-1-100-$n$) inputs the stored data as a select signal of the selector circuit to a selection element 101.

The selection element 101 determines an input source of the data on the basis of the data outputted from the command retaining device 108 provided with the flip-flop circuits 100-1 through 100-$n$. The data outputted from the PE 6 is adjusted by the selection of the selection element 101.

A command retaining device 102 receives an input of instruction data 107 stored in the configuration memory 7. The command retaining device 102 is stored with the data inputted to the flip-flop circuits 103-1 through 103-$n$.

The flip-flop circuits 103-1 through 103-$n$ are stored with the inputted data. The flip-flop circuits 103-1 through 103-$n$ output the inputted data (an operation command) to an operation device 106.

The control device 104, upon receiving the switchover of the type of the operation to be executed by the PE 6 from the selector 10, instructs the operation device 106 to conduct the execution via a delay control device 105. The control device 104 executes an instruction of transmitting and receiving the data via the delay control device 105. The control device 104 is notified of the timing of the clock (CLK). The control device 104 controls the data in accordance with the notified clock timing.

The delay control device 105 delays the instruction given from the control device 104 by a predetermined period of delay time, thus transferring the instruction to the operation device 106. Each delay control device 105 operates within the reconfigurable circuit 5, thereby executing the delay control within the reconfigurable circuit 5. Further, in addition to the delay control by the delay control device 105, the operation device 106 may execute the delay control.

The instruction data 107 stored in the configuration memory 7 is data containing the instruction for switching over the type of the operation to be executed by the PE 6. Operation target data is data selected by the selection element 101.

The switchover of the connection by the selector 10 will be explained with reference to FIG. 3. The selector 10, when receiving the instruction of the connection switchover by the selector 10 (as depicted by an arrowhead 201 in FIG. 3), reads data about a next connection from the configuration memory 9 (which is illustrated with Config in FIG. 3). The selector 10 switches over the connection on the basis of the readout data. Thus, the connection is switched over by the selector 10. This switchover is executed at the rising edge of the clock. The control device 104 sends a data transmitting/receiving instruction via the delay control device 105. Therefore, after the selector 10 has switched over the connection of the network, the transmission and reception of the data are carried out with a delay for the delay time caused by the delay control device 105.

The operation device 106 receives an instruction of executing the operation from the delay control device 105. The operation device 106 executes the operation on the basis of this operation executing instruction. The operation device 106 executes arithmetic logical processing of the operation target data on the basis of the data (operation command) inputted to the flip-flop circuits 103-1 through 103-$n$.

The switchover of the type of the operation to be executed by the PE 6 will be described with reference to FIG. 3. The PE 6, when receiving the instruction of the switchover of the type of the operation to be executed (which is depicted by an arrowhead 200 in FIG. 3), reads data designating a type of the operation next to the type of the operation, which is in the process of its execution, from the instruction data 107 stored in the configuration memory 7. A logic circuit 109, when the operation switchover instruction (the write enable signal) is inputted, outputs the data (Config) designating the type of the operation to be executed next to the command retaining device 102. The command retaining device 102 rewrites the command retained in the command retaining device 102 with the inputted data designating the type of the operation to be executed next. Thus, the PE 6 switches over the type of the operation to be executed in a disable status on the basis of the data read out of the configuration memory 7. The PE 6, after switching over the type of the operation to be executed by the PE 6, sets the operation type in an enable status by canceling the disable status. The data in the configuration memory 7 are written to the flip-flop circuits 103-1 through 103-$n$ at the rising edge of the clock (CLK) thereafter. The PE 6, hereafter, executes the arithmetic logical processing of the arithmetic logical processing target data undergoing the delay control by the delay control device 105.

Thus, an operation switchover instruction 200 represents the switchover to the operation to be executed next. Therefore, the operation switchover instruction 200 may be 1-bit information such as "1" representing the switchover instruction. On the other hand, items of information designating a variety of operation types require a large quantity of information. The PE 6, after receiving the operation switchover instruction represented by 1 bit, loads the instruction data 107 designating the type of the operation from the configuration memory 7 connected to the PE 6. Through this operation, the reconfigurable circuit 5 reduces the time required for switching over the operation to be executed by the PE 6 to a greater degree than by loading the large quantity of information designating the types of the operations via the network 8. Further, the reconfigurable circuit 5 similarly, with respect to the connection switchover by the selector 10, reduces the time for the connection switchover by the selector 10 to a greater degree than by loading the information about the connection switchover into the selector 10 from the configuration memory 9 in response to the connection switchover instruction 201 represent by 1 bit.

Hereinafter, to begin with, the autonomous control by the PE 6, the selector 10 or by the PE 6 and the selector 10 will be explained. Given next is an explanation of the control of the reconfigurable circuit 5 by the sequence control unit that controls the whole operation of the PE 6, the whole operation of the selector 10, or controls batchwise the whole operation of the PE 6 and the whole operation of the selector 10.

[Concerning Autonomous Control of Circuit by Processor Element, Selector, or by Processor Element and Selector]

The autonomous control of the reconfigurable circuit 5 by the PE 6, the selector 10, or by the PE 6 and the selector 10, will hereinafter be described with reference to FIGS. 2 through 4 and FIGS. 5A and 5B.

Switchover Example of Operation Executed by Processor Element

Figure 21:
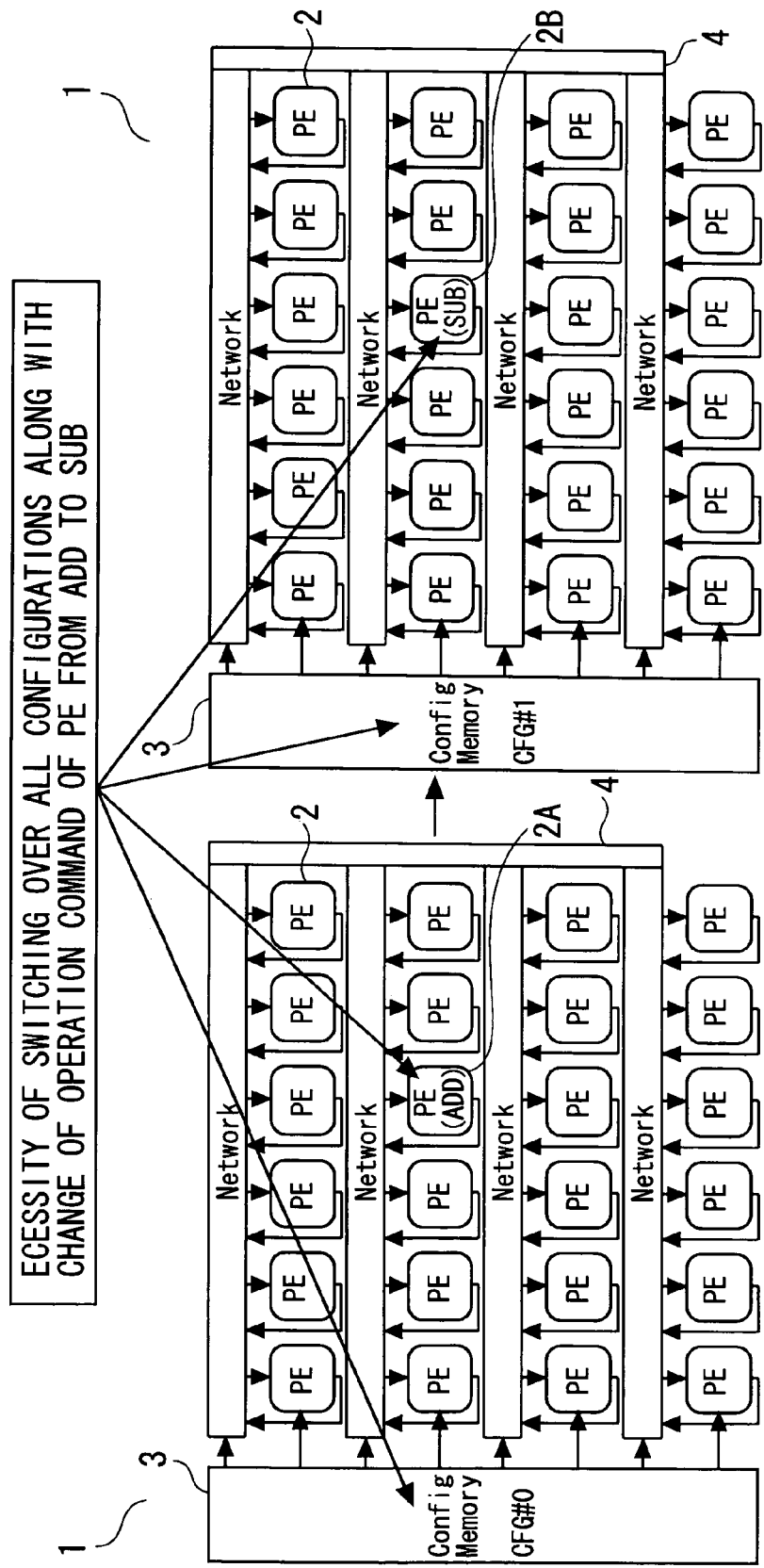
FIG. 21 is a diagram showing an example of switching over a type of the operation to be executed by the processor element according to the prior art.
Figure 22:
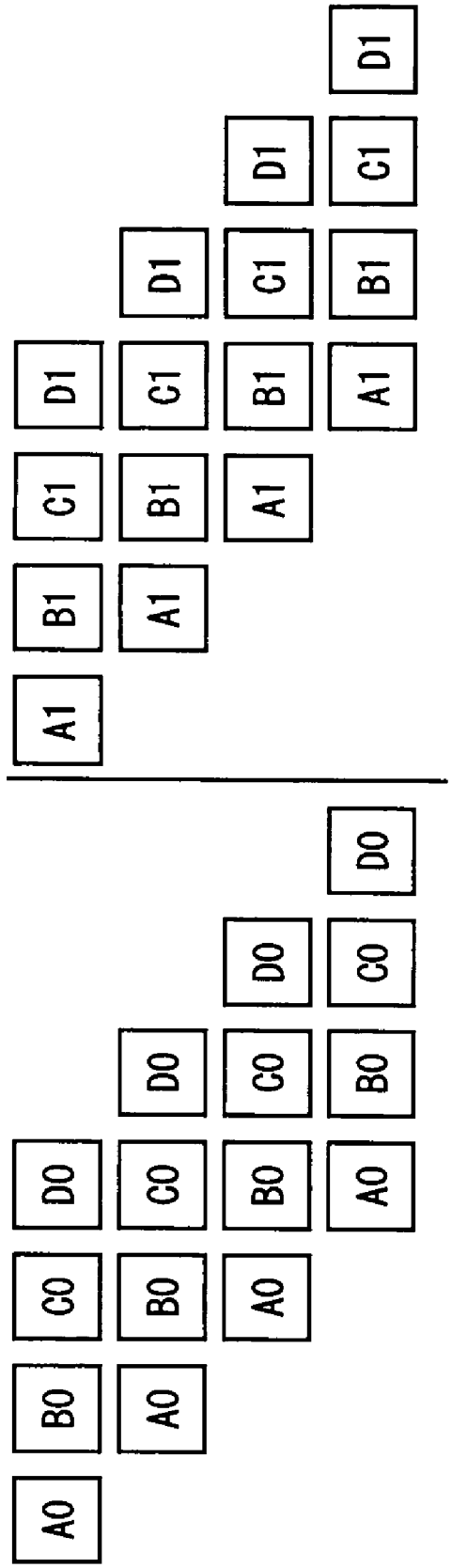
FIG. 22 is a diagram showing an example of a pipeline illustrated for carrying out the reconfigurable circuit according to the prior art.

An example in which the reconfigurable circuit 5 switches over the operation to be executed by one of the plurality of PEs 6 from addition (shown as ADD) to subtraction (shown as SUB), will be explained with reference to FIG. 4. The switchover in the configuration of the reconfigurable circuit according to the prior art has already been described with reference to FIG. 21. In the illustrated example, the PE 6 autonomously switches over the operation to be executed by the self PE 6 or one other PE 6 on the basis of the data stored in the configuration memory 7 connected to the PE 6 and the command.

Herein, the term autonomous (autonomous switchover) connotes that the PE 6 switches over the type of the operation to be executed by the self PE 6 or by one other PE 6. Further, this autonomous switchover may include that the connection by the self selector 10 or one other selector 10 is switched over by the selector 10. Still further, this autonomous switchover may include that the PE 6 switches over the selector 10.

Figure 4:
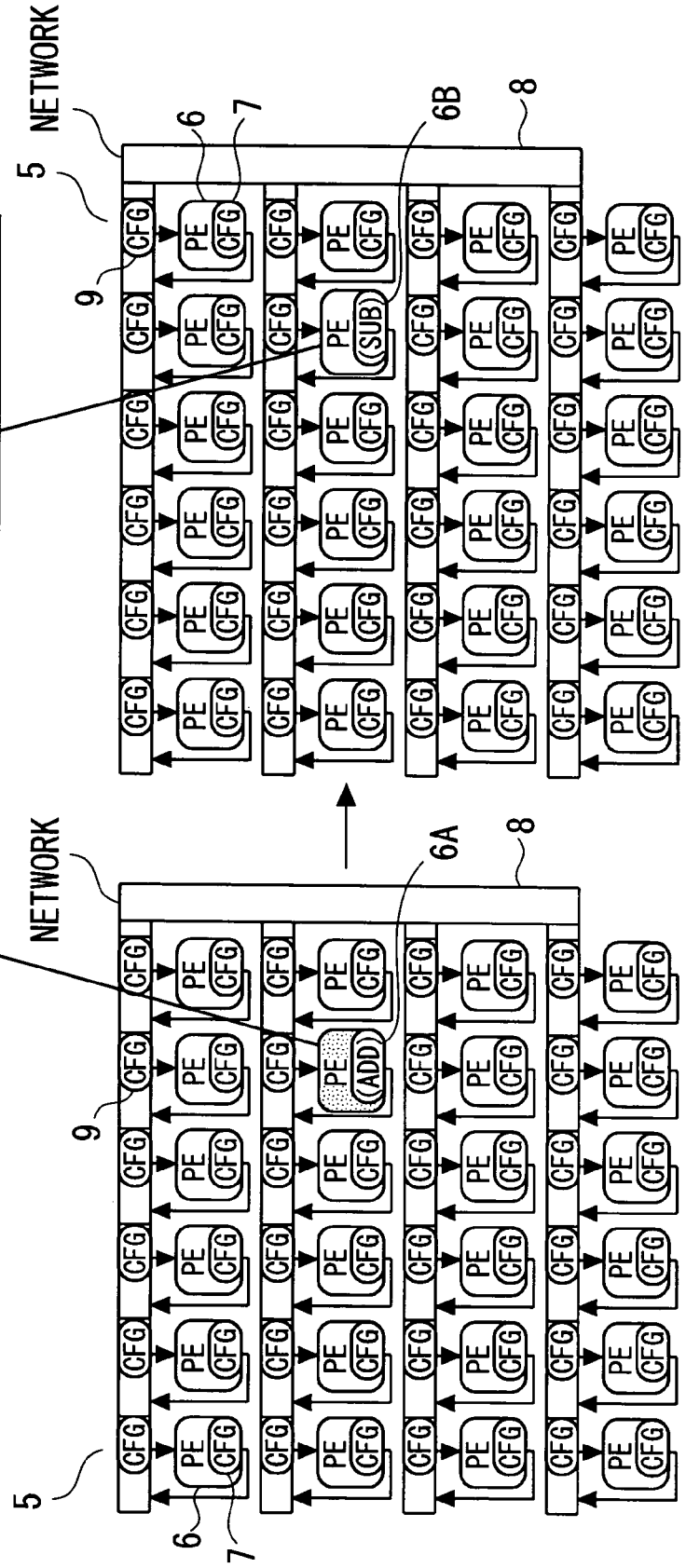
FIG. 4 is a diagram showing a first switchover example of an operation executed by the processor element.

In an example shown in FIG. 4, the PE 6, during a predetermined clock, after executing the addition on the basis of the data stored in the configuration memory 7 and the command, switches over the operation to be executed to the subtraction. The PE 6, after switching over the operation, executes the subtracting operation. The PE 6 executes the switchover on the basis of the data stored in the configuration memory 7 connected to the PE 6 and designating the type of the operation to be executed. Accordingly, a comparatively small memory may suffice for the configuration memory 7, and hence the PE 6 accesses the configuration memory 7 and loads the data at a high speed. Therefore, the PE 6 can switch over the operation to be executed at the rising edge of the clock. The PE 6 is thereby capable of processing the operation target data without any futility of 1 clock.

A case where the operation executed by the single PE 6 is, as shown in FIG. 4, switched over to the subtraction from the addition, will be explained. An assumption is that the PE 6 is configured to have two types of operations such as the addition and the subtraction. In this case, the data contained in the configuration data and designating the type of the operation to be executed by the PE 6 can be expressed by 1 bit. Namely, in the case of expressing the addition as "0", the subtraction can be expressed as "1".

The reconfigurable circuit 1 according to the prior art and the reconfigurable circuit 5 according to the embodiment are compared in terms of their data sizes needed on the occasion of employing such data. At first, in the reconfigurable circuit 1 in the prior art, the data stored in the configuration memory 3 and designated to PE 2 before the switchover of the circuit are, supposing that the addition and the subtraction are each expressed by 1 bit, since there are 24 pieces of processor elements (reconfigurable circuit 5 in FIG. 4), expressed by 24 bits. Moreover, after the switchover of the circuit, the data required for designating the type of the operation to be executed by the PE 2 are similarly expressed by 24 bits. Accordingly, 48 bits are needed as a size of the data used for designating the type of the operation to be executed by the PE 2. Thus, in the case of the conventional reconfigurable circuit 1, the data for switching over each of the PEs 2 is inputted irrespective of the number of the PEs 2 of which the operation type should be switched over.

Given next is an explanation of a size of bits necessary for switching over the type of the operation to be executed the PE 6 in the reconfigurable circuit 5 in the embodiment. The data contained in the configuration data and designating the type of the operation to be executed by the PE 6 are each stored in the configuration memory 7 connected to each of the PEs 6. The addition and the subtraction can be each expressed by 1 bit, and hence the PE 6 can switch over the type of the operation to be executed by the PE 6 on the basis of the 1-bit unit data stored in the configuration memory 7.

The reconfigurable circuit 5 has 24 pieces of PEs 6. The reconfigurable circuit 5 is capable of designating, with the data having the 24-bit data size, the type of the operation to be executed by the PE 6 before the switchover of the circuit. The case shown in FIG. 4 is that there is one PE 6 requiring the switchover. Accordingly, the type of the operation to be executed by the PE 6 can be switched over with the data having the 1-bit data size. Thus, in the reconfigurable circuit 5, the size of the data needed for the switchover is determined corresponding to the number of the PEs 6 undergoing the switchover. The maximum number of the PEs 6 undergoing the switchover is 24, and therefore the size of the data required for the switchover of the circuit in the reconfigurable circuit 5 is smaller than the size of the data needed in the reconfigurable circuit 1 according to the prior art.

Thus, the reconfigurable circuit 5 can execute the same parallel processing with the data having the smaller data size than by the reconfigurable circuit according to the prior art. Therefore, the reconfigurable circuit 5 is capable of executing the same parallel processing with packaging of the memory having a smaller capacity than by the conventional reconfigurable circuit.

Example of Switchover of Connection in Network

An operational example of the circuit on such an occasion that the reconfigurable circuit 5 switches over the connection within the network 8, will be exemplified with reference to FIG. 2. The selector 10 switches over the connection by the selector 10 on the basis of the data stored in the configuration memory 11 connected to the selector 10 and the command. Considered by way of an example is a case in which the PE 6C transmits signals containing a result of the operation of the PE 6C to the PE 6D via the network 8 first. Further, there is considered a case where the reconfigurable circuit 5 switches over a signal output destination from the transmission to the PE 6D from the PE 6C to the transmission to the PE 6E from the PE 6C. In this case, the control is conducted based on the data stored in the configuration memory 11A and the command in order for the selector 10A not to transmit the signal from the PE 6C to the PE 6D. Moreover, the control is conducted based on the data stored in the configuration memory 11B and the command in order for the selector 10B not to transmit the signal from the PE 6C to the PE 6D.

On the other hand, the control is conducted based on the data stored in the configuration memory 11C and the command in order for the selector 10C to transmit the signal from the PE 6C to the PE 6E. Still further, the control is conducted based on the data stored in the configuration memory 11D and the command in order for the selector 10D to transmit the signal from the PE 6C to the PE 6E.

Thus, each of the selectors 10A-10D controls the signal from the PE 6C on the basis of the data stored in each of the configuration memories 11A-11D and the command, thereby switching over the connection within the network 8. The selector 10 executes the switchover on the basis of the data stored in the configuration memory 11 connected to the selector 10. Accordingly, the selector 10 accesses the configuration memory 11 connected to the selector 10 and is therefore capable of accessing the data at a high speed. Hence, the selector 10 can execute this type of connection switchover at the rising edge of the clock.

Moreover, the reconfigurable circuit 5 does not reconfigure the network 8 by use of the configuration data that designates the configuration of the whole circuit as done by the prior art. Hence, the reconfigurable circuit 5 can reduce the time for reconfiguring the circuit to the greater degree by loading the data than by the reconfigurable circuit 1 according to the prior art.

Supposing that 6 pieces of switches are provided inside the selector 10, the data having a 6-bit data size are required for designating individual switches. The reconfigurable circuit 5 includes 48 pieces of selectors 10. Accordingly, the data for designating the connection of the circuit before the switchover of the circuit require a 288-bit data size. There was a necessity of setting the data of each of the selectors regardless of the number of the selectors that should do the switchover.

A case where one of the selectors 10 switches over the connection will be considered. The data for designating the connection of one of the selectors may suffice in the reconfigurable circuit 5 in the embodiment, and hence the connection by the selector can be switched over with the data having a 6-bit unit data size. Thus, in the reconfigurable circuit 5, the data size of the data needed for switching over the connection is determined corresponding to the number of the switches that should switch over the operation within the selector 10. If 6 pieces of switches are provided within the selector 10, the data size of the data required in the reconfigurable circuit 1 according to the prior art is of the 288-bit unit and is therefore smaller than the data size of the data needed in the reconfigurable circuit 5.

Thus, the reconfigurable circuit 5 can execute the same parallel processing with the data having the smaller data size than by the reconfigurable circuit according to the prior art. Therefore, the reconfigurable circuit 5 is capable of carrying out the same parallel processing with the packaging of the memory having the smaller capacity than by the conventional reconfigurable circuit.

Figure 5A:
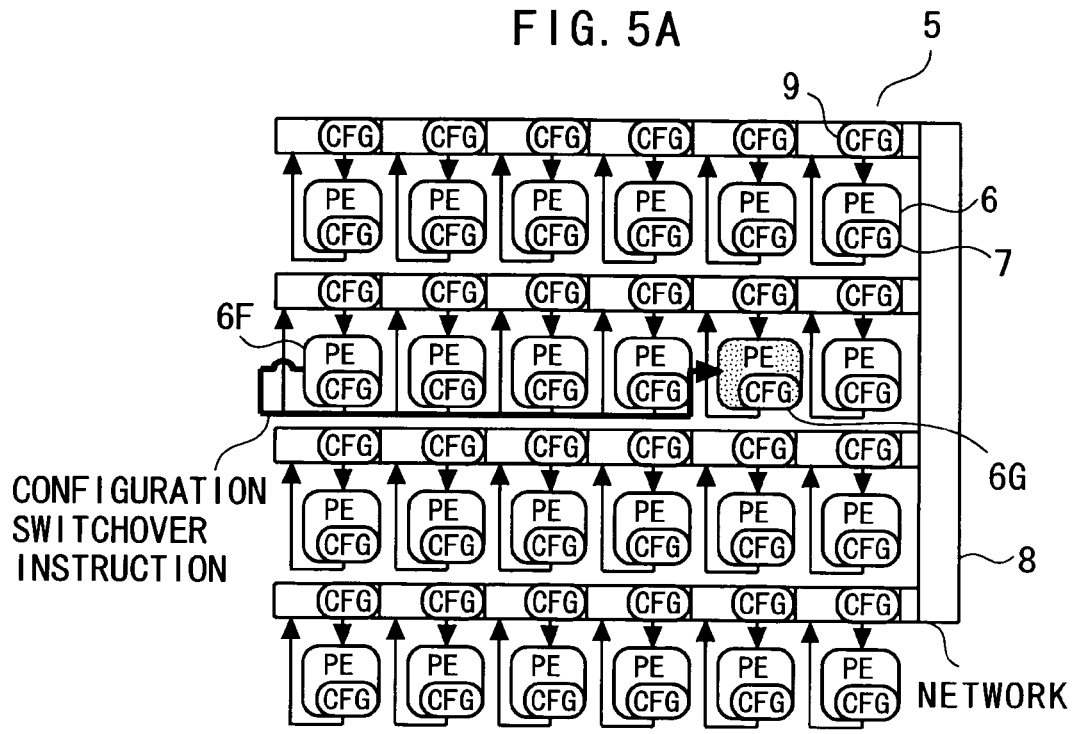
FIG. 5A is a first diagram showing a second switchover example of the operation executed by the processor element.
Figure 5B:
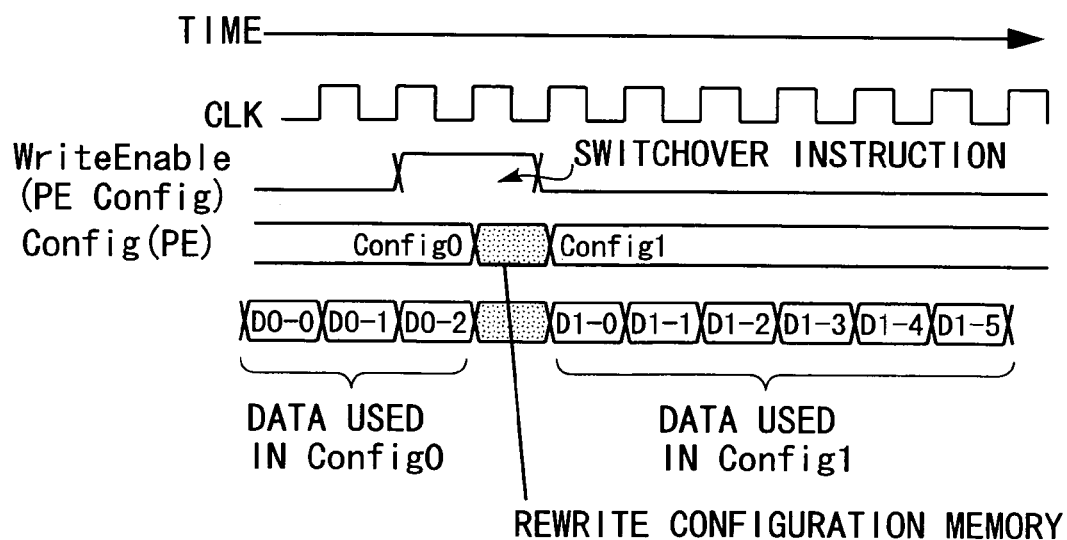
FIG. 5B is a second diagram showing the second switchover example of the operation executed by the processor element.

Operation Executed by Processor Element and Example of Switchover of Connection in Network FIGS. 5A and 5B each show an operation in which one of the plural PEs 6 included in the reconfigurable circuit 5 instructs one of other PEs 6 to switch over the operation. FIG. 5A is a diagram of a circuit configuration and shows the operation in which the PE 6F issues the switchover instruction to the PE 6G.

FIG. 5B shows the operation of switching over the type of the operation to be executed by the PE 6G in a way that employs the clock, the write enable signal, the configuration of the PE 6G and the data used for the configuration of the PE 6G.

At first, FIG. 5A shows the operation, wherein the PE 6F, on the occasion of switching over the type of the operation to be executed by the PE 6G, transmits to the PE 6G the write enable signal designating a type next to the type of the operation to be executed by the PE 6G, thus instructing the PE 6G to conduct the switchover. The write enable signal transmitted by the PE 6F is sent to the PE 6G via the network 8. The PE 6G, upon receiving the write enable signal, switches over the type of the operation to be executed by the PE 6G at the rising edge of the clock through the logic circuit 109. Thus, the type of the operation to be executed by the PE 6G is switched over. The PE 6G processes the operation target data according to the switched-over type of the operation.

Thus, the PE 6F transmits to the PE 6G the instruction of switching over the type of the operation to be executed. Then, the PE 6G executes the switchover of the type of the operation to be executed on the basis of the transmitted instruction. Accordingly, since the communication for this instruction requires the time, this circuit resumes the operation after 1 clock.

FIG. 5B shows Config0 as a configuration (the type of the operation to be executed by) of the PE 6G before the switchover and Config1 as a configuration of the PE 6G after the switchover. Further, FIG. 5B shows D0-0, D0-1 and D0-2 as pieces of data used (processed) in the circuit configuration of Config0 and D1-0, D1-1, D1-2 . . . , as pieces of data used in the circuit configuration of Config1. These pieces of data are data inputted to the PE 6G from the configuration memory 7 or the network 8.

Moreover, one of the PEs 6 may instruct one of the selectors 10 to switch over the connection by the selector 10.

[Concerning Control by Sequence Control Unit Controlling All Processor Elements, All Selectors, or All Processor Elements and All Selectors]

FIGS. 2 through 4 and FIGS. 5A and 5B have illustrated how the processor element 6, the selector 10, or the processor element 6 and the selector 10 autonomously control the reconfigurable circuit 5. An operation of the sequence control unit 12 in the case of further adding the sequence control unit 12 controlling all the processor elements 6, all the selectors 10, or controlling batchwise all the processor elements 6 and all the selectors 10, will hereinafter be described with reference to FIGS. 6A and 6B and FIGS. 7 through 17.

Figure 6A:
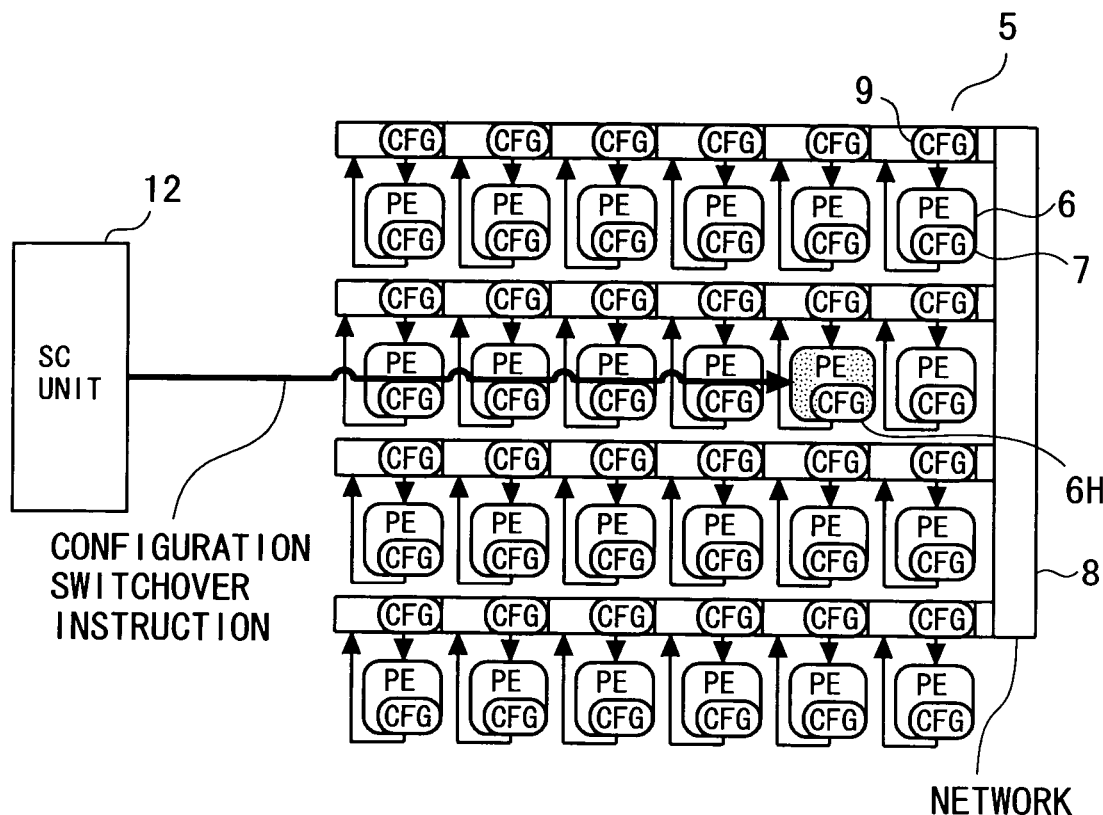
FIG. 6A is a first diagram showing a third switchover example of the operation executed by the processor element.

FIG. 6A shows the case in which the reconfigurable circuit 5 further includes the sequence control unit 12 that batchwise controls the all the PEs 6 and all the selectors 10. The sequence control unit 12 is connected directly to all the PEs 6 and to all the selectors 10 (not shown). The sequence control unit 12 instructs the PE 6, the selector 10, or the PE 6 and the selector 10 to switch over the circuit configuration. FIG. 6A depicts how the sequence control unit 12 operates to make the PE 6H switch over the type of the operation to be executed.

Figure 6B:
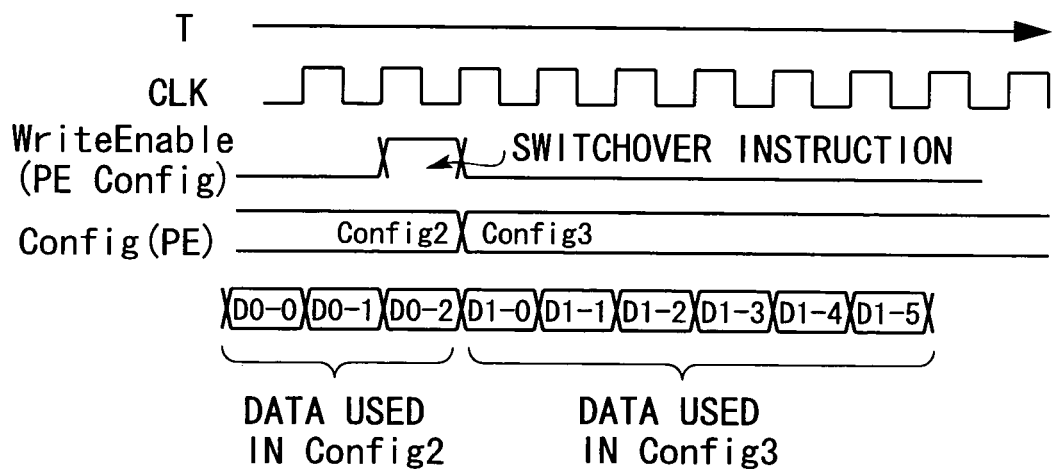
FIG. 6B is a second diagram showing the third switchover example of the operation executed by the processor element.

FIG. 6B shows how the sequence control unit 12 makes the PE 6H switch over the type of the operation to be executed in a way that uses the clock, the write enable signal, the configuration of the PE 6H and the data used for the configuration of the PE 6H.

Example of Switchover of Operation to be Executed by Processor Element

FIG. 6A shows the operation of how the sequence control unit 12 (corresponding to an operation control device according to the present invention) instructs the PE 6H to switch over the type of the operation. The sequence control unit 12, on the occasion of switching over the type of the operation to be executed by the PE 6H, instructs the PE 6H to switch over the operation type by transmitting the write enable (Write Enable) signal thereto.

Designated in the sequence control unit 12 are pieces of information about the circuit configuration switchover timing, the PE 6 executing the switchover and the selector 10 executing the switchover. The sequence control unit 12 includes a storage medium (unillustrated) such as a hard disc stored with these items of designation. This designation is executed in such a way that a circuit etc included in an LSI packaging the sequence control unit 12 makes a program analysis of the instruction inputted by the user, which is based on a program etc.

The sequence control unit 12 executes the instruction of switching over the operation by the PE 6H in a way that transmits the write enable signal earlier than the switchover timing based on the clock used inside the LSI. Thus, the sequence control unit 12 transmits the switchover instruction earlier than the switchover timing, thereby making it possible to restrain the time expended for the communication between the sequence control unit 12 and the reconfigurable circuit 5.

Further, the PE 6H switches over the type of the operation to be executed at the rising edge of the clock. The PE 6H, after switching over the type of the operation to be executed, processes the operation target data with a delay for the predetermined delay time. The PE 6H, after processing the operation target data, increments a value of the program counter by 1. Thus, the PE 6H can process the operation target data without any futility of 1 clock.

FIG. 6B shows Config2 as a configuration (the type of the operation to be executed by) of the PE 6H before the switchover and Config3 as a configuration of the PE 6H after the switchover. Further, FIG. 6B shows D0-0, D0-1 and D0-2 as pieces of data used (processed) in the configuration of Config2 and D1-0, D1-1, D1-2 . . . , as pieces of data used in the configuration of Config3. These pieces of data are data inputted to the PE 6H from the configuration memory 7 or the network 8.

Figure 7:
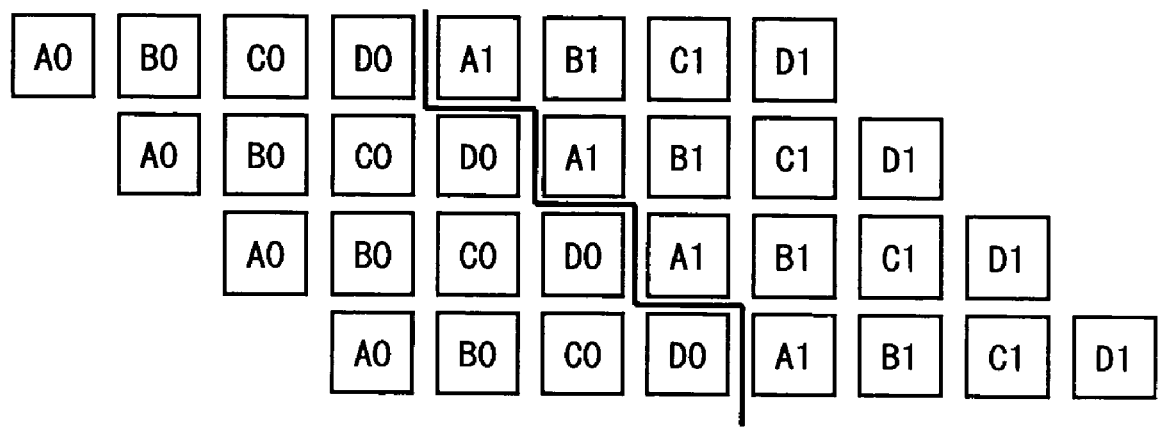
FIG. 7 is a diagram showing an example of a pipeline illustrated for carrying out a reconfigurable circuit according to the embodiment.

FIG. 7 shows a pipeline on such an occasion that the sequence control unit 12 shown in FIG. 6A switches over (reconfigures) the configuration of the reconfigurable circuit 5. The sequence control unit 12 switches over each of the PEs 6 without any futility of 1 clock. Accordingly, as illustrated in FIG. 7, the sequence control unit 12 switches over the configuration of the reconfigurable circuit 5 without any futility of 1 clock. Hence, as shown in FIG. 7, the pipeline has no occurrence of such a clock that the operation target data is not processed.

Moreover, the sequence control unit 12 (corresponding to a connection control device according to the present invention) shown in FIG. 6A instructs the selector 10 to switch over the connection by the selector 10, whereby the connection (the connection by the selector 10) within the network 8 can be switched over. In this case also, in the same way as in the case of switching over the type of the operation to be executed by the PE 6 explained above, the connection (the connection by the selector 10) within the network 8 can be switched over to the process for the operation target data without any futility of 1 clock.

Operation Executed by Processor Element and Example of Switchover of Connection in Network Next, an operation in which the sequence control unit 12 instructs the PE 6 to switch over the type of the operation to be executed and instructs the selector 10 to switch over the connection, will hereinafter be described with reference to FIGS. 8 through 13.

Figure 8:
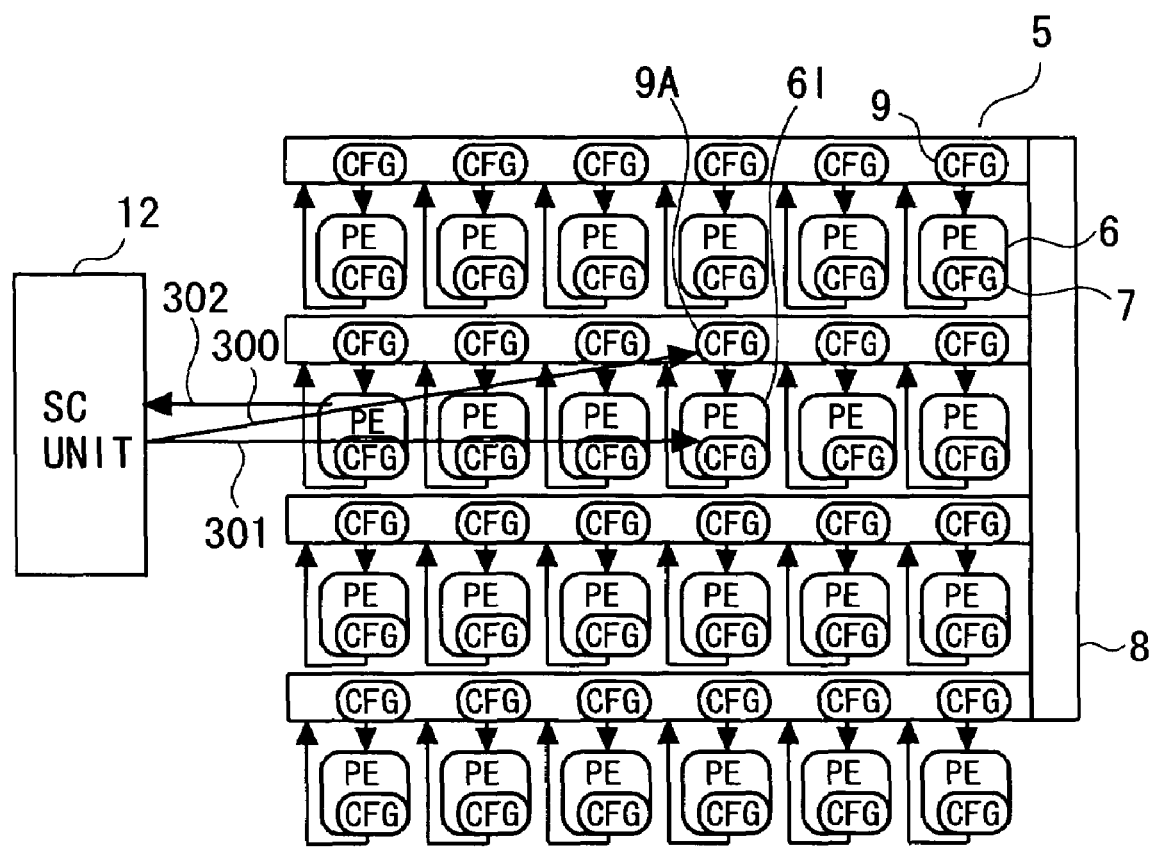
FIG. 8 is a diagram showing a switchover example of the operation to be executed by the processor element and of the connection in the network.

FIG. 8 shows the operation, wherein the sequence control unit 12 instructs (301) the PE 6I to switch over the type of the operation to be executed, while the sequence control unit 12 gives an instruction (300) (the switchover of the connection by the selector 10) of switching over the connection within the network 8. The sequence control unit 12 is connected directly to all the PEs 6 (i.e., 24 pieces of PEs 6 in FIG. 8) and to all the selectors 10 (i.e., as based on (counted in) FIG. 2, 48 pieces of selectors 10 in FIG. 8) (not shown).

The sequence control unit 12 instructs the PE 6 to switch over the type of the operation to be executed by the PE 6, and the sequence control unit 12 instructs the selector 10 to switch over the connection by the selector 10. The sequence control unit 12 includes a storage medium (not shown) such as a hard disc stored with these items of designation. Designated in the sequence control unit 12 are pieces of information about the operation type switchover timing, the PE 6 executing the switchover and the selector 10 executing the switchover. This designation is executed in such a way that an analyzing program (e.g., a compiler) etc executed in the LSI packaging the sequence control unit 12 analyzes a program etc inputted by the user.

The sequence control unit 12 gives the instruction of switching over the operation by the PE 6I earlier than at the switchover timing based on the clock used inside the LSI, while the sequence control unit 12 gives an instruction of switching over the connection by the selector 10 connected to the configuration memory 9 by use of the write enable signal. The selector 10, upon receiving the input of the write enable signal, loads the data (Cinfig) about the next connection by the selector 10 from the configuration memory 9 connected to the selector 10. The selector 10 switches over the connection on the basis of the loaded data.

Thus, the sequence control unit 12 transmits the switchover instruction earlier than at the switchover timing, thereby making it possible to restrain the time expended for the communication between the sequence control unit 12 and the reconfigurable circuit 5.

Moreover, the PE 6I switches over the type of the operation to be executed at the rising edge of the clock. The PE 6I, after switching over the type of the operation to be executed corresponding to the write enable signal from the sequence control unit 12, processes the operation target data with a delay for the predetermined delay time. The PE 6I, after processing the operation target data, increments the value of the program counter by 1. Thus, the PE 6I can process the operation target data without any futility of 1 clock. The PE 6I, upon terminating the operation to be executed, transmits a termination signal to the sequence control unit 12 (302).

The selector 10, when receiving the connection switchover instruction, switches over the connection at the rising edge of the clock. The selector 10 executes the data communications after switching over the connection. Accordingly, the selector 10 can execute the switchover of the connection without any futility of 1 clock.

The reconfigurable circuit 5 thus operates based on the PE 6 undergoing the switchover and the selector 10 undergoing the switchover. Thus, the reconfigurable circuit 5 switches over the type of the operation executed by the PE 6 and switches over the connection by the selector 10. A process executed by the sequence control unit 12 will hereinafter be described in greater detail with reference to FIGS. 9 through 12.

To start with, a unique symbol is assigned to each of the plurality of PEs 6, thus distinguishing between the plurality of PEs 6. To give an example, [PE 1], [PE 2], . . . , [PE 6] are assigned, sequentially from the left, to the PEs 6 disposed at the uppermost stage among the PEs 6 shown in FIG. 8. [PE 7], [PE 8], . . . , [PE 12] are assigned, sequentially from the left, to the PEs 6 disposed at the second uppermost stage among the PEs 6 shown in FIG. 8. The distinction among the plurality of PEs 6 is thus made. Further, a 2-tuple of selectors 10 outputting the signals to the [PE 1] are designated by [NW 1]. The 2-tuple of selectors 10 outputting the signals to the [PE 2] are designated by [NW 2]. The 2-tuples of selectors outputting the signals to the PEs 6 are designated such as [NW 1], [NW 2], [NW 3], . . . , thus distinguishing between the selectors 10.

Figure 9:
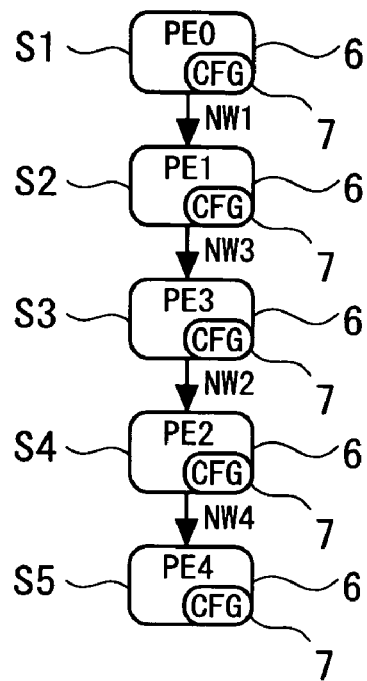
FIG. 9 is a diagram showing an example of a process to be executed by a sequence control unit.

FIG. 9 shows an example in which the sequence control unit 12 gives the switchover instruction to the reconfigurable circuit 5. In this example, when the operation by the [PE 0] is terminated, the [PE 0] transmits to the sequence control unit 12 a termination signal showing that the operation by the [PE 0] is terminated (S1). Information that the operation by the [PE 0] is to be terminated is designated previously in the sequence control unit 12. Accordingly, the sequence control unit 12, before receiving the termination signal from the [PE 0], transmits a signal instructing the switchover to [NW 1]. With this operation, the switchover is executed without any futility of 1 clock. The [PE 1], when receiving the signal instructing the switchover of the [PE 1] from the sequence control unit 12, switches over the [PE 1] on the basis of a command contained in this signal. The [NW 1], when receiving a signal instructing the switchover of the [NW 1] from the sequence control unit 12, switches over the [NW 1] on the basis of an instruction contained in this signal.

Next, when the operation by the [PE 1] is terminated, the [PE 1] transmits the termination signal of the termination by the [PE 1] to the sequence control unit 12 (S2). Information that the [PE 1] is to terminate the operation is designated previously in the sequence control unit 12. Accordingly, the sequence control unit 12, before receiving the termination signal from the [PE 1], transmits a signal instructing the switchover to [PE 3] and [NW 3]. With this operation, the switchover is executed without any futility of 1 clock. The [PE 3], when receiving the signal instructing the switchover of the [PE 3] from the sequence control unit 12, switches over the [PE 3] on the basis of a command contained in this signal. The [NW 3], when receiving a signal instructing the switchover of the [NW 3] from the sequence control unit 12, switches over the [NW 3] on the basis of an instruction contained in this signal.

Thus, the sequence control unit 12 instructs the processes in step S1-S5. Then, based on the instructions by the sequence control unit 12, the [PE 1]-[PE 4] switch over the operations to be executed, and the [NW 1]-[NW 4] switch over the connections, respectively.

Figure 10:
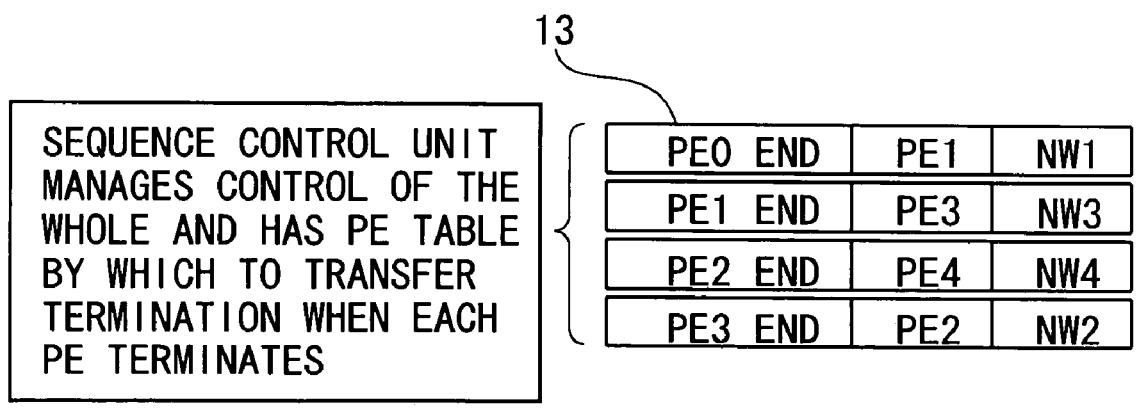
FIG. 10 is a diagram showing an example of a sequence table.

FIG. 10 shows an example of a sequence table 13 used for executing the processes by the sequence control unit 12 illustrated in FIG. 9. The sequence control unit 12 is stored with the sequence table 13. The sequence control unit 12, based on the sequence table 13, instructs the switchover of the operation to be executed by the PE 6 and the switchover of the connection within the network 8. The sequence table 13 contains the instruction so as to switch over the [PE 1] and the [NW 1] before the operation by the [PE 0] is terminated (shown as "PE0 END"). The sequence table 13 contains the instruction so as to switch over the [PE 3] and the [NW 3] before the operation by the [PE 1] is terminated(shown as "PE1 END"). The sequence table 13 contains the instruction so as to switch over the [PE 4] and the [NW4] before the operation by the [PE 2] is terminated(shown as "PE2 END"). The sequence table 13 contains the instruction so as to switch over the [PE 2] and the [NW2] before the operation by the [PE 3] is terminated(shown as "PE3 END"). The sequence control unit 12 executes the processes shown in FIG. 9 on the basis of this sequence table 13.

Further, the sequence control unit 12 may also be stored with a sequence table in which to instruct only the switchover of the type of the operation to be executed by the PE 6. Still further, the sequence control unit 12 may also be stored with a sequence table in which to instruct only (the switchover of) the connection by the selector 10.

FIG. 23 shows an example of a switchover timing indication table 36 showing a relationship between an operation count of the operations executed by the PE 6 till the operation is terminated and a value of a PC value with respect to the [PE 0]-[PE n]. The switchover indication table 13 is stored in the sequence control unit 12.

The switchover timing indication table 36 shows that, for instance, the PE 0 executes the operation five times when the PC value is 0. The switchover timing indication table 36 shows that, for instance, the PE 0 executes the operation once when the PC value is 1.

Thus, the sequence control unit 12 can recognize, from the switchover timing indication table 36, the operation count of the operations to be executed by each of the PEs 6. Therefore, the sequence control unit 12, before each of the PEs 6 finishes executing the operation, can prepare and execute the instruction for switching over the type of the operation to be executed. As the sequence control unit 12 thus operates, the PE 6 can receive the instruction for switching over the type of the operation to be executed by the PE 6 through the communications without any delay. Accordingly, the reconfigurable circuit 5 can reduce the time needed for the switchover.

Figure 11:
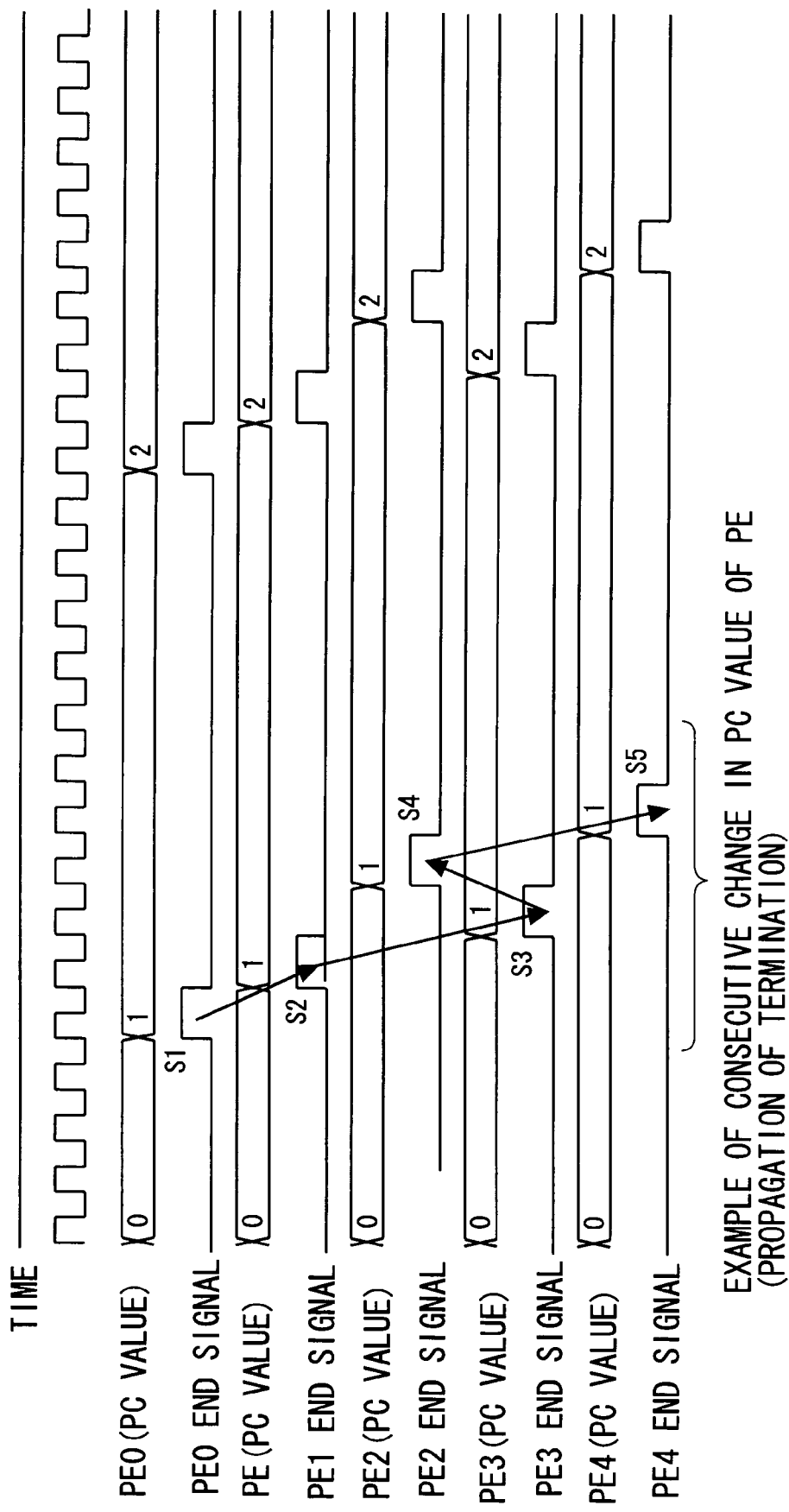
FIG. 11 is a diagram showing an operation in which a PC value is incremented.

FIG. 11 shows a relationship between the process by the PE 6 in response to the instruction given from the sequence control unit 12 shown in FIG. 9, the transmission of the termination signal by the PE 6 and the clock (CLK). Herein, FIG. 11 shows the value (PC value) of the program counter as an index representing the type of the operation to be executed by the PE 6. In FIG. 11, a value of 0 is initially assigned as the PC value to each of the plurality of PEs 6. Then, the PC value is set so that its value is incremented by ones each time the type of the operation to be executed by the PE 6 is switched over. FIG. 11 shows an example in which the PC value of the PE 6 changes consecutively corresponding to the clock.

The symbols of steps S1-S5 are added (shown) in FIG. 11 in order to clarify the correspondence to the processing steps shown in FIG. 9. Further, arrowheads for representing the order of the processes by the sequence control unit 12 are depicted in FIG. 11. The sequence control unit 12 instructs the switchover of the PE 6 in the order indicated by these arrowheads.

As shown in FIG. 11, the [PE 0], when the operation by the [PE 0] is terminated, increments the PC value by 1 and transmits the termination signal to the sequence control unit 12. The PC value is used for showing the switchover of the type of the operation to be executed by the PE 6. The sequence control unit 12, before receiving the termination signal from the [PE 0], sends the operation switchover instruction to the [PE 1] on the basis of the sequence table 13. The [PE 1] switches over the operation on the basis of the operation switchover instruction. The [PE 1], when the operation by the [PE 1] is terminated, increments the PC value by 1 and transmits the termination signal to the sequence control unit 12. Thus, the processes in steps S1-S5 are instructed by the sequence control unit 12.

Figure 12:
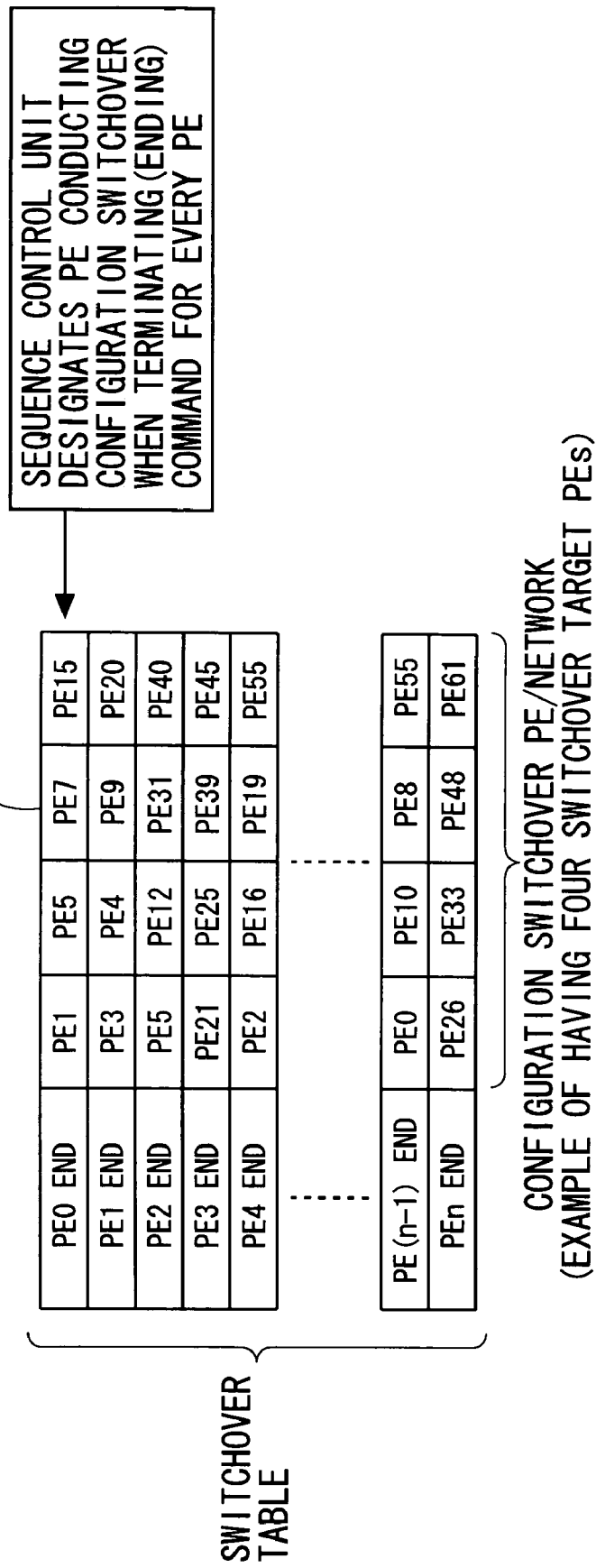
FIG. 12 is a diagram showing an example of a switchover table.

FIG. 12 shows an example of a switchover table in the case of having (n+1) pieces of PEs 6 of [PE 0] through [PE n]. The sequence table 13 shown in FIG. 10 is a table provided for the sequence control unit 12 to instruct the switchover of the operation to be executed by the single PE 6 and the switchover of the connection within the network 8 connecting to the PE 6.

A switchover table 14 shown in FIG. 12 is used for the sequence control unit 12 to give the switchover instruction to the plurality of PEs 6 before the predetermined PE 6 terminates the operation. The sequence control unit 12 is stored with the switchover table 14. For example, the sequence control unit 12, based on the switchover table 14, before the operation by the [PE 0] is terminated, instructs the [PE 1], [PE 5], [PE 7] and [PE 15] to switch over the operations to be executed. Further, the sequence control unit 12, based on the switchover table 14, before the operation by the [PE 1] is terminated, instructs the [PE 3], [PE 4], [PE 9] and [PE 20] to switch over the operations. Thus, the sequence control unit 12, before the operation by one of the plurality of PEs 6 is terminated, instructs the four PEs 6 to conduct the switchovers. Thus, the sequence control unit 12, on the occasion of terminating the operation by the single PE 6, enables the plurality of operations to be switched over.

Figure 13:
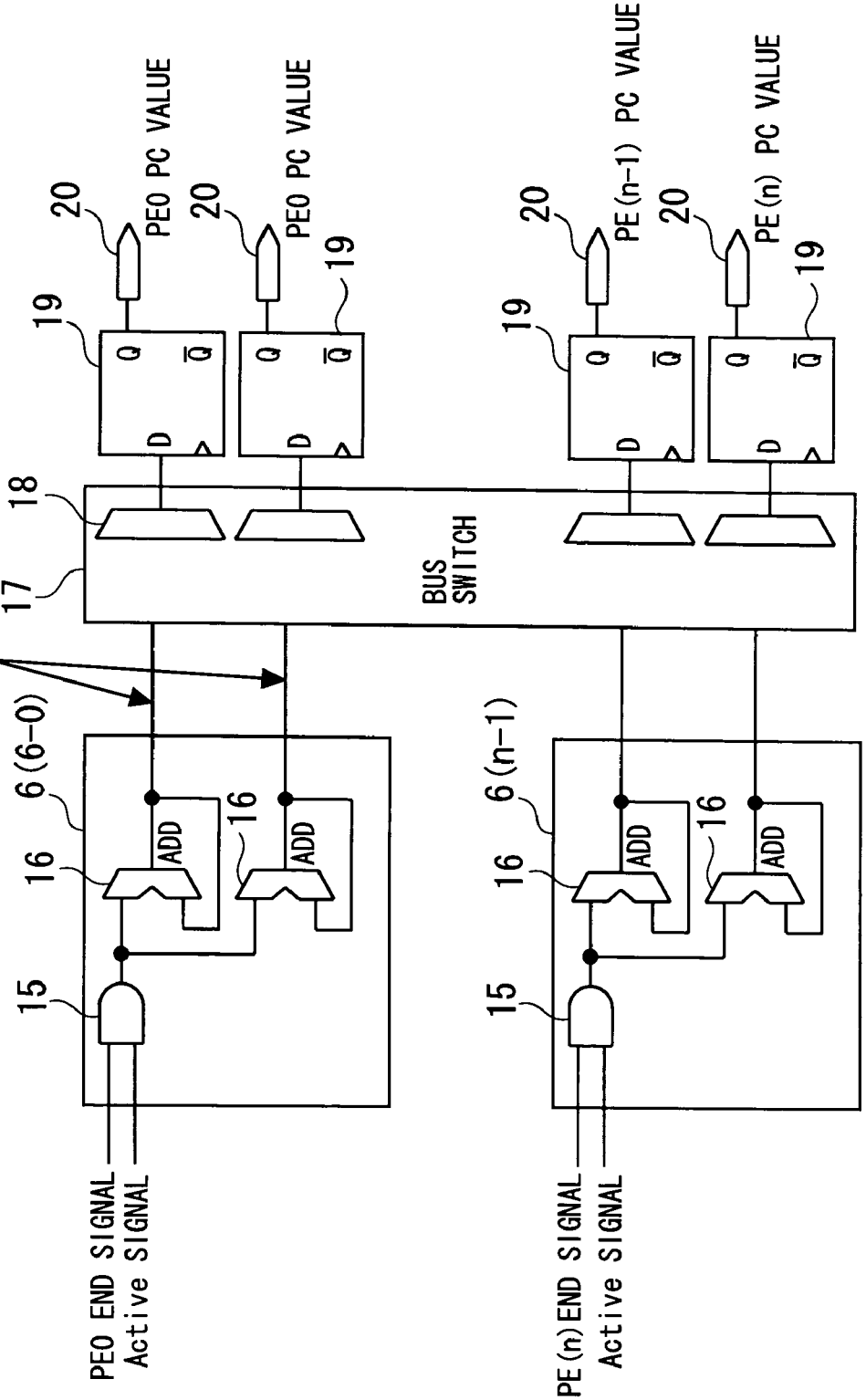
FIG. 13 is a diagram showing a basic configuration of a system for transmitting a PC value to the sequence control unit.

FIG. 13 is a block diagram showing a circuit that retains the PC values. Further, FIG. 13 also shows a system for transmitting the PC values retained by the PE 6 to the sequence control unit 12. This block diagram illustrates a plurality of AND circuits 15, a plurality of adders (ADD) 16 connected to the AND circuits 15, a bus switch 17 connected to the adders 16, selectors 18 operating within the bus switch 17 and adjusting an output from the bus switch 17, flip-flop circuits 19 connected to the bus switch 17 and retaining the inputted values, and output ports 20 connected to the flip-flop circuits 19. The output ports 20 are connected to the sequence control unit 12 (unillustrated). Moreover, in this block diagram, one AND circuit 15 and two adders 16 are provided in the single PE 6.

Inputted to the AND circuit 15 is a signal representing 1 as a signal showing that the termination signal is inputted, or a signal representing 0 as a signal showing that the termination signal is not inputted. Further inputted to the AND circuit 15 is a signal representing 1 as a signal showing that the PE 6 operations, or a signal representing 0 as a signal showing that the PE 6 does not operate.

The signal outputted from the AND circuit 15 is inputted to the adder 16. The adder 16 adds a numerical value represented by the inputted signal to a numerical value retained by the adder 16, and transmits a signal representing the added numerical value to the bus switch 17.

The bus switch 17 executes signal processing so as to transmit, via the selectors 18, the input signals from the [PE 0]-[PE n] to output ports corresponding to the [PE 0]-[PE n], and then outputs these signals. The flip-flop circuit 19 retains the signal from the bus switch 17, and outputs the retained signal to the output port 20. Thus, the PC values of the [PE 0]-[PE n] are inputted respectively to the output ports 20. The signals inputted to the output ports 20 are outputted to the sequence control unit 12. Thus, the PC values outputted by the [PE 0]-[PE n] are inputted to the sequence control unit 12.

Example of Execution of Operation

Next, an example of executing the operation by the reconfigurable circuit 5 will hereinafter be described with reference to FIGS. 14 through 17. In this process, the reconfigurable circuit 5 calculates a numerical value representing an average color of an image formed of (3×3) pixels, i.e., 9 pixels by way of an example. The reconfigurable circuit 5 weights an image filter coefficient to values representing these pixel colors, and outputs a total value of the weighted values. This total value represents the average color of the image colors.

Each of matrix elements of a matrix X shown in FIG. 14 is the numerical value representing the individual pixel color, and has one of the values of, e.g., 0 through 255. These pieces of data are set as image data. In FIG. 14, x00, x10, x20, x01, x11, x21, x02, x12, x22 are given as the matrix elements. The reconfigurable circuit 5 stores a line buffer with, e.g., the matrix element "x00" as the image data of the upper left pixel of the image. Further, the reconfigurable circuit 5 stores the line buffer with, e.g., "x02" as the image data of the lower left pixel of the image. Thus, the reconfigurable circuit 5 stores the image data in the line buffer.

FIG. 15 shows the image filter coefficients. In FIG. 15, a00, a10, a20, a01, a11, a21, a02 are given as the image filter coefficients. The reconfigurable circuit 5 stores the configuration memory 7 with, e.g., the image filter coefficient a00 as the image filter coefficient for the upper left pixel of the (3×3) pixel image. Further, the reconfigurable circuit 5 stores the configuration memory 7 with, e.g., the image filter coefficient a02 as the image filter coefficient for the lower left pixel of the (3×3) pixel image.

Figure 16:
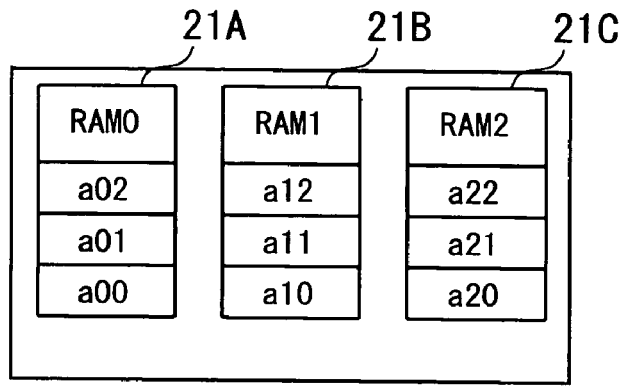
FIG. 16 is a diagram showing an example of image filter coefficients stored in a configuration memory.

FIG. 16 shows an example of a data structure of the image filter coefficients as readout control target coefficients by the PE 6. On the occasion of processing the operation target data, the PE 6 reads the data stored in the configuration memory 7. The PE 6 executing this readout control is expressed as a [RAM]. In this process, the PEs 6 executing the readout control involve using three pieces of PEs 6 expressed as [RAM 0]-[RAM 2].

Further, the configuration memory 7 connected to the [RAM 0] is stored with the image filter coefficients a00, a01, a02. The [RAM 0] reads the image filter coefficients a00, a01, a02 in this sequence, which are stored in the configuration memory 7. The configuration memory 7 connected to the [RAM 1] is stored with the image filter coefficients a10, a11, a12. The [RAM 1] reads the image filter coefficients a10, a11, a12 in this sequence, which are stored in the configuration memory 7. The configuration memory 7 connected to the [RAM 2] is stored with the image filter coefficients a20, a21, a22. The [RAM 2] reads the image filter coefficients a20, a21, a22 in this sequence, which are stored in the configuration memory 7.

In this operation executing example, the reconfigurable circuit 5 makes calculations the following formula (1).

$$Y = a00*x00 + a01*x01 + a02*x02 + \quad \text{[Mathematical Expression 1]}$$
$$a10*x10 + a11*x11 + a12*x12 +$$
$$a20*x20 + a21*x21 + a22*x22$$

Figure 17:
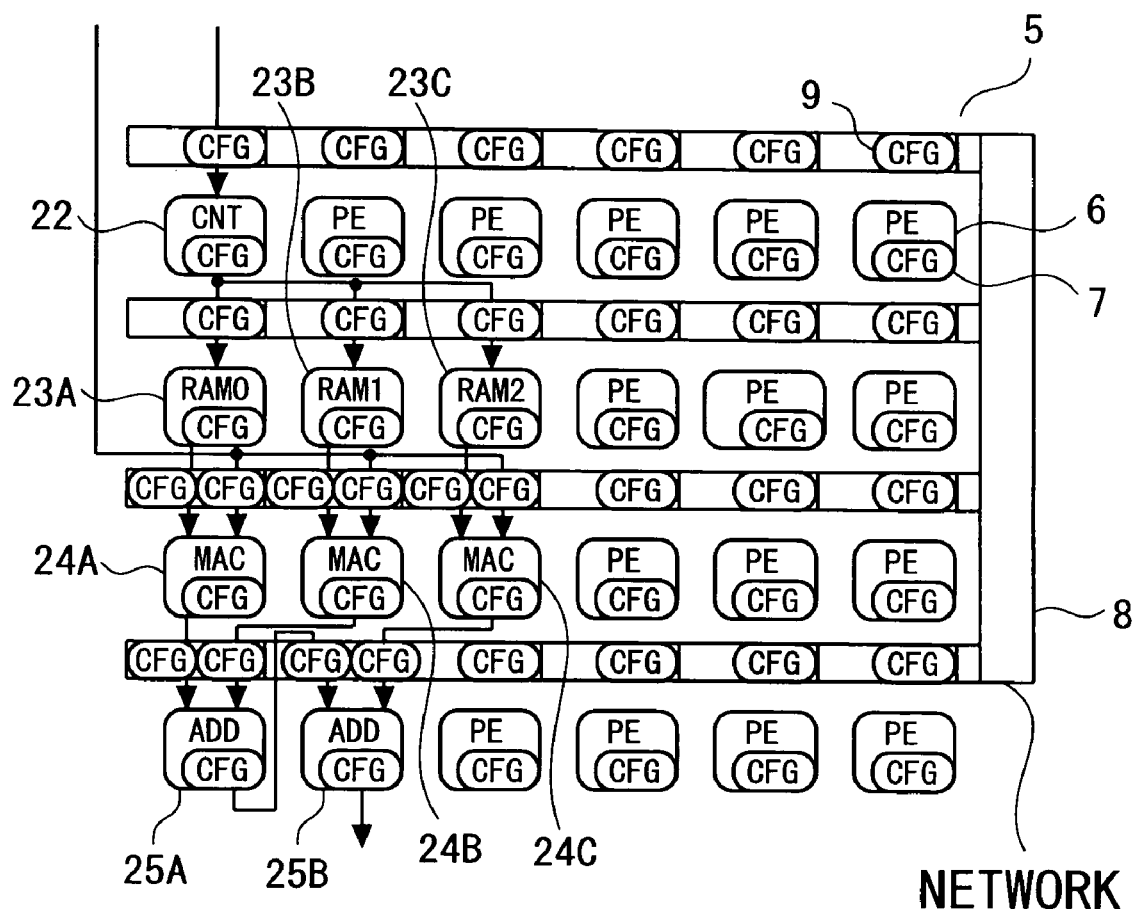
FIG. 17 is a diagram showing an example of executing an operation by a reconfigurable circuit.

,where "+" means addition, "*" means multiplication. FIG. 17 shows the operation executing example when the reconfigurable circuit 5 makes the calculations in the formula (1). To begin with, the instruction of the operation is inputted to a CNT (counter 22). The CNT 22 instructs each of a RAM 23A specifying [RAM 0], a RAM 23B specifying [RAM 1] and a RAM 23C specifying [RAM 2] to execute the operation. The RAM 23A reads the image filter coefficient a00 from the configuration memory 7. The RAM 23A transmits the readout image filter coefficient a00 to a MAC 24A. The RAM 23B reads the image filter coefficient a10 from the configuration memory 7. The RAM 23B transmits the readout image filter coefficient a10 to a MAC 24B. The RAM 23C reads the image filter coefficient a20 from the configuration memory 7. The RAM 23C transmits the readout image filter coefficient a20 to a MAC 24C.

On the other hand, the image data x00 given from outside the reconfigurable circuit 5 is inputted to the MAC 24A. The image data x10 given from outside the reconfigurable circuit 5 is inputted to the MAC 24B. The image data x20 given from outside the reconfigurable circuit 5 is inputted to the MAC 24C.

The MAC 24A multiplies the inputted image data x00 by the image filter coefficient a00, and transmits a signal containing a result of the multiplication to the ADD 25A. Namely, the signal containing the result of the calculation of x00×a00 is transmitted to the ADD 25A. The MAC 24B multiplies the inputted image data x10 by the image filter coefficient a10, and transmits a signal containing a result of the multiplication to the ADD 25A. Namely, the signal containing the result of the calculation of x10×a10 is transmitted to the ADD 25A. The MAC 24C multiplies the inputted image data x20 by the image filter coefficient a20, and transmits a signal containing a result of the multiplication to the ADD 25B. Namely, the signal containing the result of the calculation of x20×a20 is transmitted to the ADD 25B.

The ADD 25A adds the result of the operation by the MAC 24A that is received from the MAC 24A to the result of the operation by the MAC 24B that is received from the MAC 24B, and transmits a signal containing a result of the addition to the ADD 25B. Namely, a signal containing the result of the calculation of x00×a00+x10×a10 is transmitted to the ADD 25B. The ADD 25B adds the result of the operation by the ADD 25A that is received from the ADD 25A to the result of the operation by the MAC 24C that is received from the MAC 24C, and transmits a signal containing a result of the addition to the ADD 25B. Namely, the calculation of x0×a00+x10× a10+x20×a20 is executed.

Thus, the reconfigurable circuit 5 executes the calculation of x00×a00+x10×a10+x20×a20 included in the formula (1). The reconfigurable circuit 5 repeats the processes described above, thereby executing the calculations in the formula (1).

FIRST MODIFIED EXAMPLE

Figure 18:
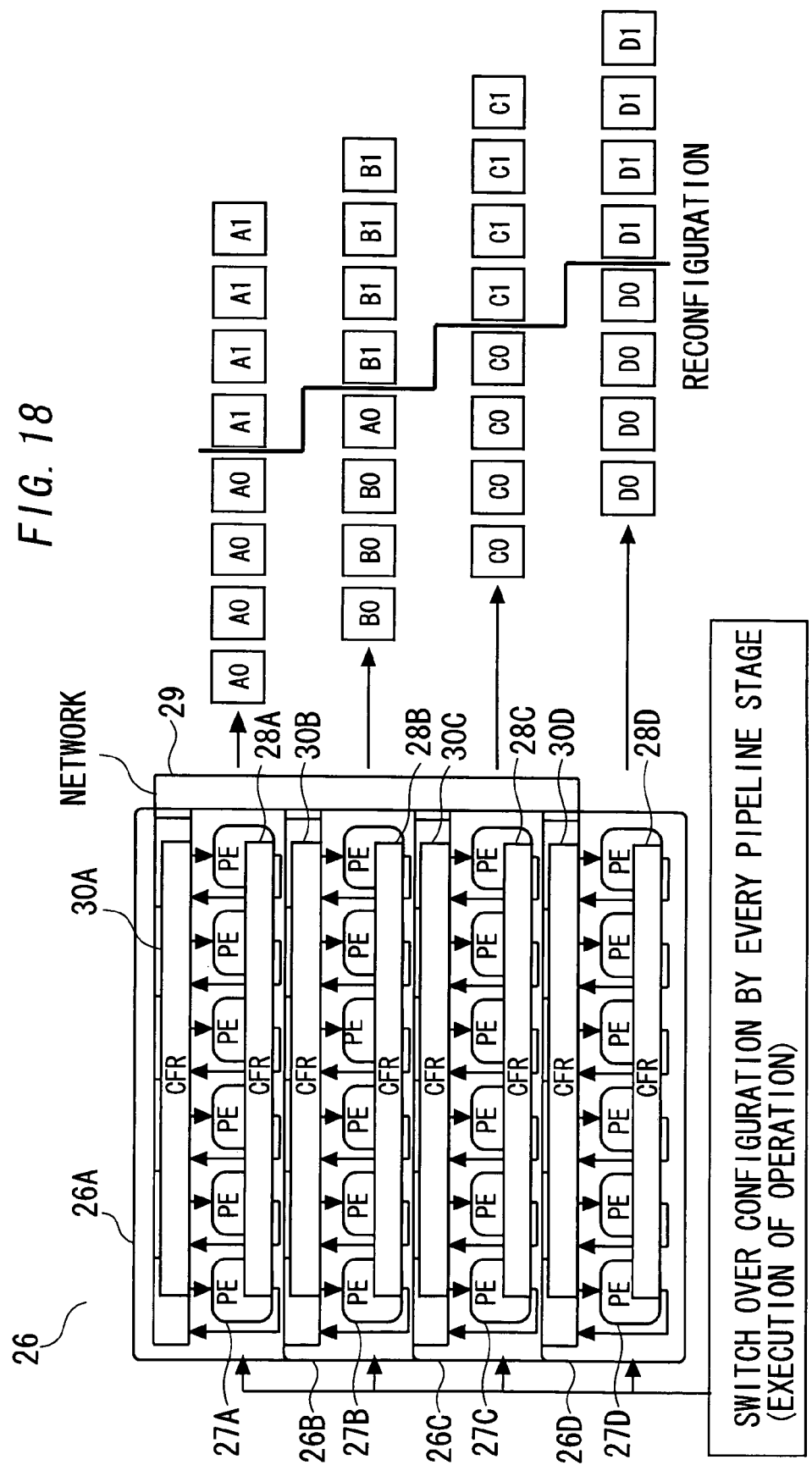
FIG. 18 is a diagram showing the reconfigurable circuit in a first modified example of the embodiment.

FIG. 18 shows a first modified example of the reconfigurable circuit in the embodiment of the present invention. A reconfigurable circuit 26 has circuits 26A-26D and a network 29 that connects the circuits 26A-26D. The circuit 26A has a plurality of PEs 27A, a configuration memory 28A connected to all the plurality of PEs 27A, and a configuration memory 30A in the network 29 connecting to the plurality of PEs 27A. The circuit 26B has a plurality of PEs 27B, a configuration memory 28B connected to all the plurality of PEs 27B, and a configuration memory 30B in the network 29 connecting to the plurality of PEs 27B. The circuit 26C has a plurality of PEs 27C, a configuration memory 28C connected to all the plurality of PEs 27C, and a configuration memory 30C in the network 29 connecting to the plurality of PEs 27C. The circuit 26D has a plurality of PEs 27D, a configuration memory 28D connected to all the plurality of PEs 27D, and a configuration memory 30D in the network 29 connecting to the plurality of PEs 27D.

The circuits 26A-26D output processing results each shown as one pipeline. For instance, the circuit 26A outputs a processing result termed A1 in a right part of the diagram in FIG. 18. Further, the circuit 26A outputs a processing result termed A0, which is a result of the reconfiguration of the circuit. The circuit 26B outputs a processing result termed B1 in the right part of the diagram in FIG. 18. Further, the circuit 26B outputs a processing result termed B0, which is a result of the reconfiguration of the circuit. The circuit 26C outputs a processing result termed C1 in the right part of the diagram in FIG. 18. Further, the circuit 26C outputs a processing result termed C0, which is a result of the reconfiguration of the circuit. The circuit 26D outputs a processing result termed D1 in the right part of the diagram in FIG. 18. The circuit 26D outputs a processing result termed D0, which is a result of the reconfiguration of the circuit.

In such a case that the number of stages of pipelines (operation control flows) in which to execute the operation is previously known, the reconfigurable circuit 26 has a circuit configuration on a stage unit of the pipeline and is thereby able to effectively use the configuration memories 28A-28D and 30A-30D. Namely, the PEs 27A-27D can, in the same way as in the embodiment, access the configuration memories 28A-28D and 30A-30D at a high speed. Moreover, in the same way as in the embodiment, it is possible to switch over at the high speed the operations executed by the PEs 27A-27D and the connections within the network 29. Further, this is effective in the autonomous control of the PEs 27A-27D and of the connections within the network 29.

Considered also is the case of further adding, as in the embodiment, the sequence control unit (not shown) that controls the operations executed by the PEs 27A-27D and the connections within the network 9. In this case, the sequence control unit switches over, as done in the embodiment, the PEs 27A-27D and the connections within the network 9 without any futility of 1 clock.

Thus, the circuits 26A-26D can have the data about the circuit configurations batchwise in the configuration memories 28A-28D and 30A-30D. Hence, the circuits 26A-26D can organize the control items common to the configuration memories 28A-28D and 30A-30D. Therefore, the reconfigurable circuit 26 can save more resources than by the reconfigurable circuit 5.

SECOND MODIFIED EXAMPLE

Figure 19:
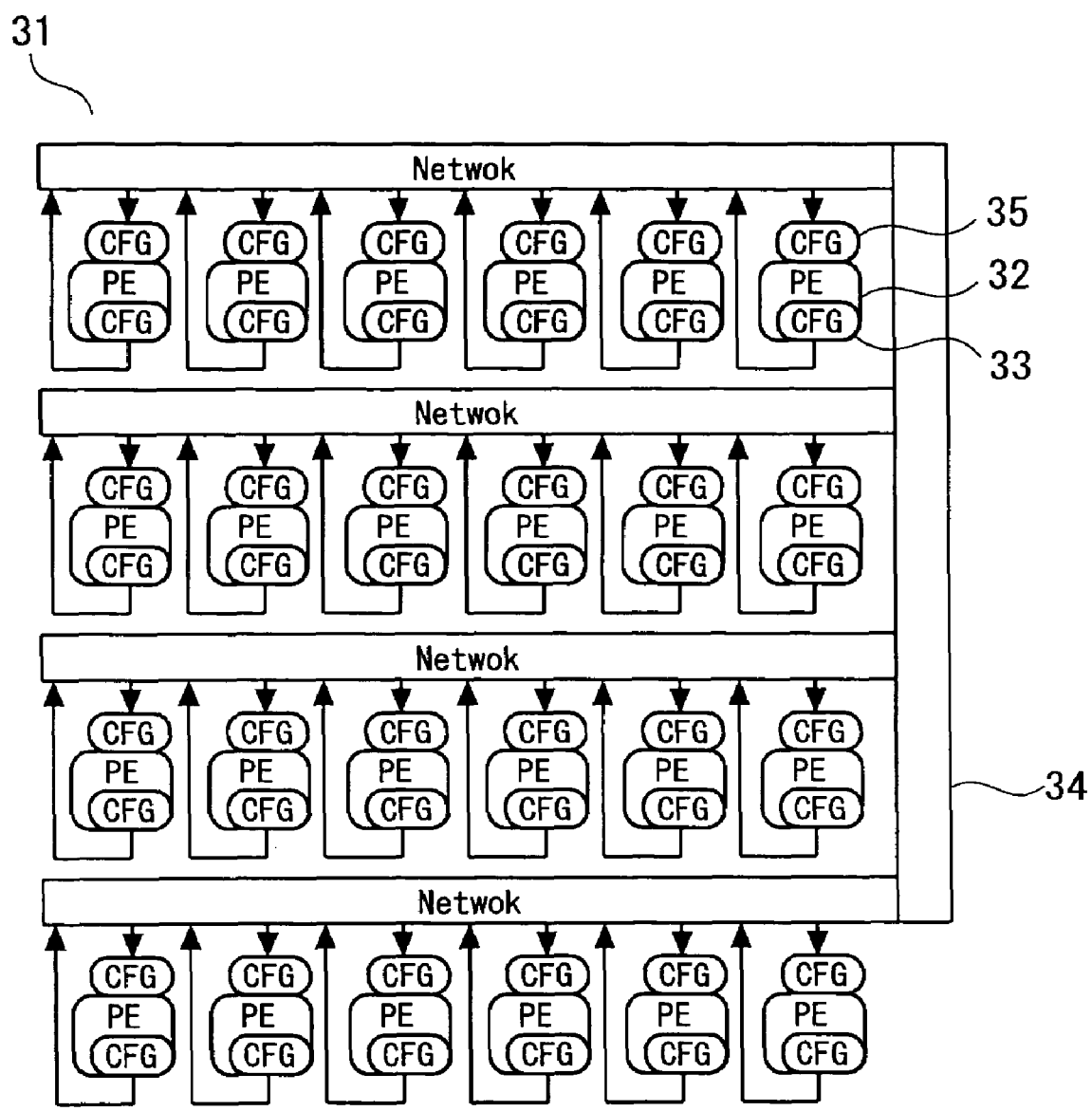
FIG. 19 is a diagram showing the reconfigurable circuit in a second modified example of the embodiment.
Figure 20:
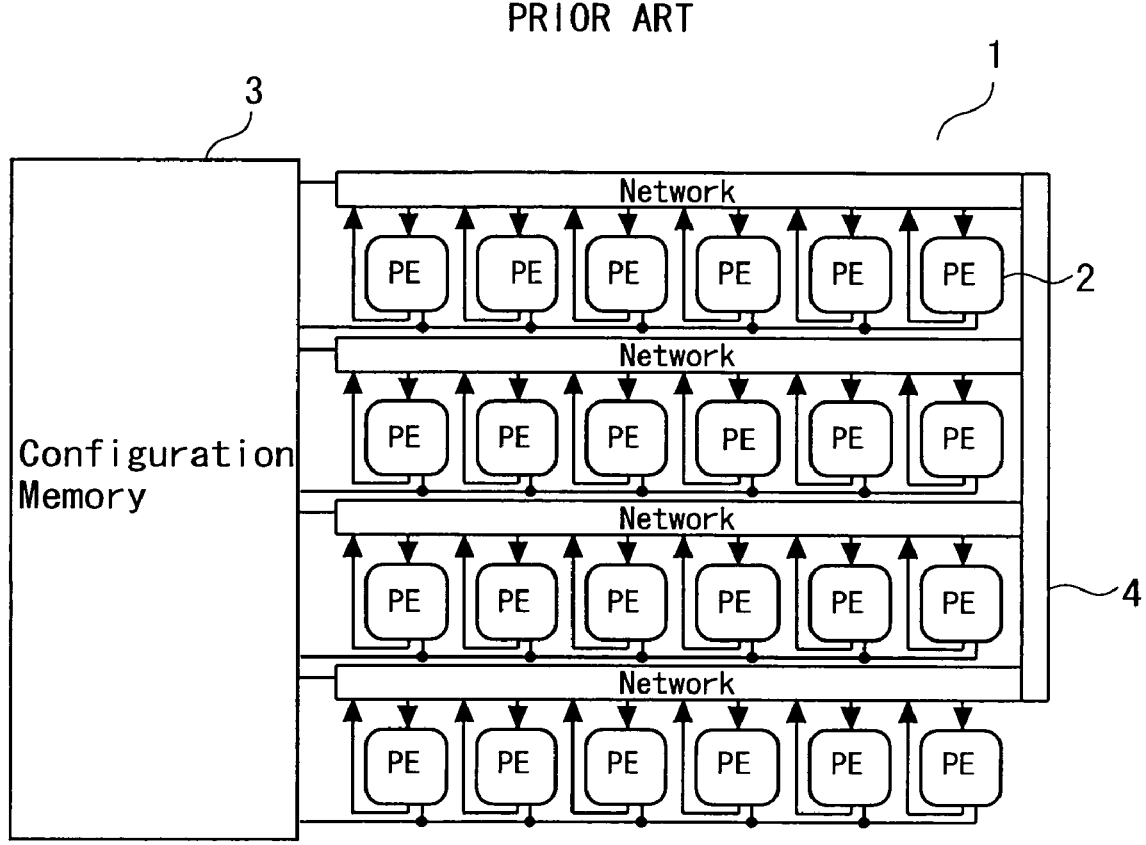
FIG. 20 is a diagram showing a reconfigurable circuit in the prior art.

FIG. 19 shows a second modified example of the reconfigurable circuit in the embodiment of the present invention. A reconfigurable circuit 31 has a plurality of PEs 32, configuration memories 33 storing information related to the PEs that are connected to the PEs 32, configuration memories 35 storing information related to a network 34 connecting to the PEs 32, and the network 34 that connects those components.

The reconfigurable circuit 31 is different from the reconfigurable circuit 5 illustrated in the embodiment in terms of such a point that the configuration memories 35 storing information related to the connection of the network 34 are connected to the PEs 32.

The selector in the network 34, which corresponds to the PE 32, controls an output of the signal to the PE 32 on the basis of the command and the data stored in the configuration memory 35 connected to the PE 32. Thus, as in the embodiment, the configuration memory 35 related to the connection of the network may be connected to the PE 32 without being connected to within the network 34.

Thus, even in such a case that the configuration memory 35 storing information related to the network 34 is connected to the PE 32, the same effects as those exhibited in the embodiment can be acquired owing to the autonomous switchover of the operation to be executed by the PE 32, the autonomous switchover of the connections in the network and the control by the sequence control unit.

<Others>

The disclosures of Japanese patent application No. JP2006-79684 filed on Mar. 22, 2006 including the specification, drawings and abstract are incorporated herein by reference.

What is claimed is:

1. A parallel processing apparatus dynamically switching over a circuit configuration, comprising:
   a plurality of computing elements;
   a network establishing connections between said plural computing elements;
   a plurality of selectors provided corresponding to said plurality of computing elements within said network and controlling as to whether said computing element is connected to said network or not;
   first local memories stored with data used for operations by said computing elements and data designating the operations, and connected to said respective computing elements; and
   second local memories stored with data designating connections by said selectors, and connected to said respective selectors.

2. A parallel processing apparatus dynamically switching over a circuit configuration according to claim 1, wherein said computing element switches over the operation executed by said self computing element and one other computing element on the basis of the data stored in said first local memory.

3. A parallel processing apparatus dynamically switching over a circuit configuration according to claim 1, wherein said selector switches over a connection state of said self selector on the basis of the data stored in said second local memory.

4. A parallel processing apparatus dynamically switching over a circuit configuration according to claim 1, further comprising operation control devices connected to said plurality of computing elements and instructing each of said computing elements to switch over the operation that should be executed.

5. A parallel processing apparatus dynamically switching over a circuit configuration according to claim 4, wherein the switchover of the operation executed for each of said computing elements is executed based on a table stored in said operation control device and retaining information about said first computing element, said second computing element of which the operation should be switched over when the operation of said first computing element is terminated, and switchover timing thereof.

6. A parallel processing apparatus dynamically switching over a circuit configuration according to claim 4, wherein said operation control device includes:
   a unit storing information about switchover timing at which the operation that should be executed next is set in each of said computing elements when the operation of each of said computing elements is terminated; and
   a switchover unit setting, before the switchover timing, data for setting the operation that should be executed next in said computing element concerned in a disable status where the input of the data is inhibited, and making, at the switchover timing, the computing element concerned be in an enable status by canceling the disenable status where the input of the switchover data is inhibited.

7. A parallel processing apparatus dynamically switching over a circuit configuration according to claim 1, further comprising connection control devices connected to said plurality of selectors and instructing each of said selectors to switch over the connection.

8. A parallel processing apparatus dynamically switching over a circuit configuration according to claim 7, wherein the switchover of the connection for each of said selectors is executed based on a table stored in said connection control device and retaining information about said first selector, said second selector of which the connection should be switched over when the connection of said first selector is terminated, and switchover timing thereof.

9. A parallel processing apparatus dynamically switching over a circuit configuration according to claim 1, wherein said first local memory connected to said one computing element is rewritten via said one computing element, while said second local memory connected to said one selector is rewritten via said one selector.

10. A parallel processing apparatus dynamically switching over a circuit configuration, comprising:
    a plurality of computing elements;
    a network establishing connections between said plural computing elements;
    a plurality of selectors provided corresponding to said plurality of computing elements within said network and controlling as to whether an output from said computing element is outputted to said network or not;
    third local memories stored with data used for operations by said computing elements and data designating the operations, and connected to every predetermined number of said computing elements capable of parallel processing and employed for executing a predetermined process; and
    a fourth local memory stored with data designating connections by said selectors and stored with connection information about said predetermined number of computing elements.

* * * * *